(12) United States Patent
Velipasalar et al.

(10) Patent No.: US 7,468,662 B2
(45) Date of Patent: Dec. 23, 2008

(54) METHOD FOR SPATIO-TEMPORAL EVENT DETECTION USING COMPOSITE DEFINITIONS FOR CAMERA SYSTEMS

(75) Inventors: Senem Velipasalar, Lincoln, NE (US); Lisa Marie Brown, Pleasantville, NY (US); Arun Hampapur, Norwalk, CT (US); Chiao-Fe Shu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/455,210

(22) Filed: Jun. 16, 2006

(65) Prior Publication Data
US 2007/0291117 A1 Dec. 20, 2007

(51) Int. Cl.
G08B 13/00 (2006.01)
H04N 7/18 (2006.01)

(52) U.S. Cl. .............. 340/541; 340/506; 340/517; 340/522; 348/135; 348/143; 348/152

(58) Field of Classification Search .......... 340/541, 340/506, 500, 5.1, 540, 545.2, 517, 521, 340/522; 348/156, 135, 143, 155, 152, 161; 707/3, 10, 101, 201; 709/203, 225, 229
See application file for complete search history.

(56) References Cited

U.S. PATENT DOCUMENTS

| | | | |
|---|---|---|---|
| 6,424,370 B1 | 7/2002 | Courtney | |
| 6,535,620 B2 | 3/2003 | Wildes et al. | |
| 7,382,244 B1 * | 6/2008 | Donovan et al. | ............ 340/506 |
| 2003/0142851 A1 | 7/2003 | Brueckner et al. | |
| 2003/0231769 A1 | 12/2003 | Bolle et al. | |
| 2004/0143602 A1 | 7/2004 | Ruiz et al. | |
| 2005/0073585 A1 | 4/2005 | Ettinger et al. | |
| 2005/0154701 A1 | 7/2005 | Parunak et al. | |
| 2005/0162515 A1 * | 7/2005 | Venetianer et al. | .......... 348/143 |
| 2005/0222895 A1 | 10/2005 | Jakobson et al. | |
| 2007/0013776 A1 * | 1/2007 | Venetianer et al. | .......... 348/143 |
| 2007/0092143 A1 * | 4/2007 | Higgins | ............ 382/228 |

OTHER PUBLICATIONS

A.C.M.Fong, S.C. Hui, M.K.H. Leung, Content-Based Video Sequence Interpretation, IEEE Transactions on Consumer Electronics, vol. 47, No. 4 Nov. 2001, pp. 873-879.

J. Black, T. Ellis, and D. Makris, A hierarchical database for visual surveillance applications: In Proc. of IEEE ICME, vol. 3, pp. 1571-1574, 2004.

F. Cupillard, A. . Avanzi, F. Bremond, and M.Thonnat, "Video understanding for metro surveillance" In Proc. of IEEE Conf. on Networking, Sensing & Control, pp. 186-191, 2004.

(Continued)

*Primary Examiner*—Toan N Pham
(74) *Attorney, Agent, or Firm*—Keusey, Tutunjian & Bitetto, P.C.; Kevin Jordan

(57) ABSTRACT

A method for monitoring events includes defining alert events based on primitive event types in an environment monitored by monitoring devices. Alert parameters are set for each alert event, and alert events are combined to create a composite alert event based on a plurality of alert events. A plurality of engines is monitored to determine if multiple events comprising the composite alert event have occurred.

1 Claim, 28 Drawing Sheets

OTHER PUBLICATIONS

Y. A. Ivanov and A. F. Bobick, Recognition of multi-agent interaction in video surveillance:, In Proc. of IEEE ICCV, vol. 1, pp. 169-176, 1999.

R. Nevatia, J. Hobbs, and B. Bolles, "An ontology for video event representation", In Proc. of IEEE Conf. on Computer Vision and Pattern Recognition Workshops, pp. 1-10, 2004.

* cited by examiner

207

| Define alert step 2: Set alert parameters - Camera Blind / Removal | ☒ |
|---|---|

Camera movement sensitivity: [▼ Medium] 246

Minimum pre-event video recording time [seconds]: [3]
248

[<Back] [Next>] [Cancel]

FIG. 7

METHOD FOR SPATIO-TEMPORAL EVENT DETECTION USING COMPOSITE DEFINITIONS FOR CAMERA SYSTEMS

BACKGROUND

1. Technical Field

The present invention relates to video processing and more particularly to a system and method for detecting events using composite alarm definitions.

2. Description of the Related Art

Tracking of objects is an important and challenging problem which finds wide-ranging application areas such as video surveillance, gathering statistics from videos, and traffic flow monitoring. Although many methods have been proposed in literature to detect and track moving objects, tracking seems insufficient for most applications. Detection and tracking results should be analyzed to detect events of interest and generate alerts. For example, in the surveillance scenario, the main interest is detecting instances of events such as people entering a prohibited region, people entering through an exit only door, people parking a car but not entering the building, etc.

Several approaches have been taken to tackle the event detection problem with single camera systems. However, a single camera does not have a large enough field of view, i.e., it does not have large enough coverage. Thus, many applications need multiple cameras. In addition, event definitions should not be pre-defined and hard-coded into a system, and the event definitions should not be limited in number. Instead, there should be a generic event definition scheme which can express and cover different, high-complexity and semantically higher level events by using a custom language. This scheme should not require the technical knowledge of the language from the end-user.

Thus, event definition itself introduces several challenges. Depending on the application and the actual user, there will be a need to define events with higher complexities, especially in multi-camera systems. In addition, defined events should be saved and entered to the system in an efficient way so that the existing tracking engines and the overall system runs in the same manner without being affected by different event definitions.

Even in a basic scenario, where, for example, one needs to detect the entrance of multiple objects in a defined region in one camera view, there are multiple parameters that can be customized by a user. Useful parameters can be the number of objects, the location and the shape of the region, and the minimum and maximum sizes of the detected objects etc. The size can be important, e.g., a user might not be interested in detecting a cat in the specified region as opposed to a car or person. There should be a user-friendly interface that can retrieve this information from the user, and then can save it into a well-structured format for the detection of the actual event in a video sequence.

However, the problem is usually more complicated than detecting motion on a single camera view. In real world scenarios, the events of interest are higher in complexity and semantic level. As an example, three event definitions which have increasing level of complexity include: 1) detecting motion in a selected region in a single camera view; 2) detecting motion in the first selected region and then detecting motion in another region in at least T seconds on the same camera view; 3) detecting motion in a selected region in the first camera view and then detecting motion in a selected region in the other camera view.

SUMMARY

A method for monitoring events includes defining alert events based on primitive event types in an environment monitored by monitoring devices. Alert parameters are set for each alert event, and alert events are combined to create a composite alert event based on a plurality of alert events. A plurality of engines is monitored to determine if multiple events comprising the composite alert event have occurred.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 shows a graphical interface for setting parameters for camera blind/removal in accordance with one illustrative embodiment;

DETAILED DESCRIPTION OF PREFERRED EMBODIMENTS

Figure 1:
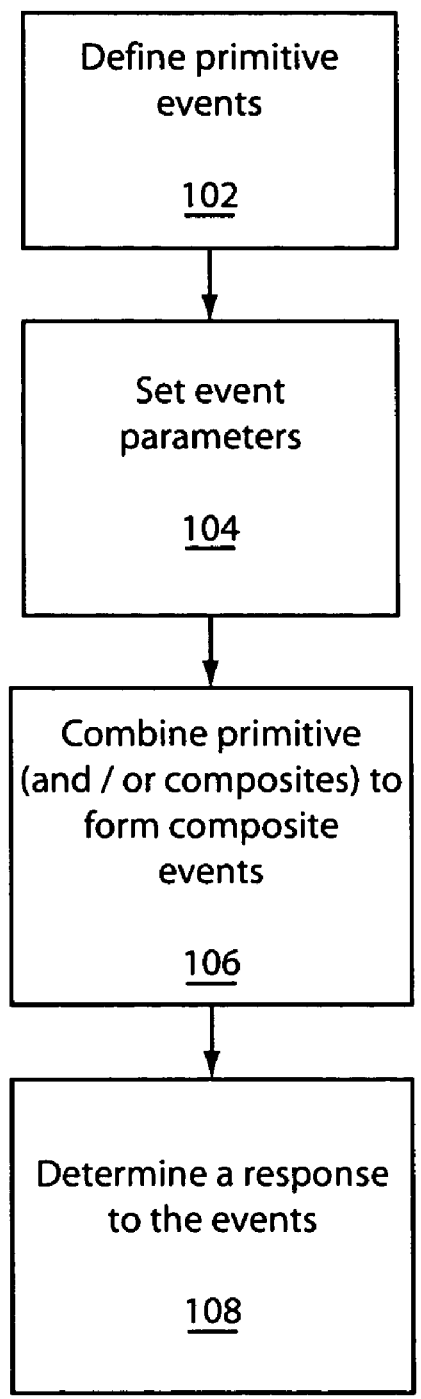
FIG. 1 is a block/flow diagram showing a system/method for establishing events for monitoring by camera in accordance with one illustrative embodiment.

Present embodiments are directed to detecting and tracking moving objects and detecting occurrences of events of interest. These occurrences may then be saved or employed to generate alerts. Recognition of these events is useful for tasks like video surveillance, video browsing and indexing. Event detection defines the events, and enters them to the system in a generic way without pre-defining and hard-coding event descriptions into the system. Flexibility to define customized events with customized parameters and to combine those among themselves is provided.

Combining events provides the ability to build composite event definitions, which have higher complexity and semantic meaning. A camera, spatial-temporal event detection system is described which permits the user to define multiple composite events of high-complexity, and then detects their occurrence in video sequences automatically. Events can be defined on a single camera view or across multiple camera views. Complicated and more sophisticated event scenarios can be built by using the building blocks or primitive events. Primitive events may be combined by operators, such as a SEQUENCE operator. Advantageously, the newly defined composite events can be named, saved and used as building blocks to combine them with other composite events.

This layered structure makes the definition of events with higher and higher complexity possible. The defined events may be written to an XML file, which is then parsed and communicated to tracking engines running on the videos of the corresponding cameras. Once a composite event is detected, an alert is generated. In accordance with aspects of the present invention, rather than simply detecting "a person is entering the building" more complex events can be detected, e.g., detecting "a person entered the building and then went to the south corridor of the building".

It is to be understood that cameras and sensors may be used interchangeably throughout the specification and claims. For purposes of this document sensors includes cameras and vice versa. Monitoring devices include either or both of cameras and sensors.

Embodiments of the present invention can take the form of an entirely hardware embodiment, an entirely software embodiment or an embodiment including both hardware and software elements. In a preferred embodiment, the present invention is implemented in a combination of hardware and software. The software includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood that different actions referred to hereinafter may be performed by equivalent actions known to those skilled in the art. For example, left and right mouse clicks may be substituted for keystrokes on a keypad or keyboard and vice versa. The interfaces described herein may be equipped with different peripherals, which may be interchangeably configured or arbitrarily set based on the design or based on user preference.

Referring now to the drawings in which like numerals represent the same or similar elements and initially to FIG. 1, a system and method for establishing spatio-temporal events to monitor and event detection by camera is described in accordance with illustrative embodiments. The system and method include a new event definition scheme and a novel interface to define and save complicated events in a generic way. More complex and complicated events can be built by using simpler basic building blocks. In block 102, alert events based on primitive event types are defined in an environment monitored by one or more cameras.

In block 104, event parameters are set for each alert event. This includes graphical and textual parameters input on one or more display screens. E.g., a graphical depiction of a region of interest can be display on a camera view; text may be entered in a field for a minimum or maximum size of an object, etc. In block 106, primitive events are combined to create a composite event based on outcomes of combined alert events. This includes defining or creating higher-level events by using multiple building blocks or "primitive events" (primitives). In block 108, a response is determined or defined for each event or composite event.

Primitive events are preferably connected to each other by an operator using a user-friendly interface. The resulting event definition can be named and used as a new building block in the next level. In this way, two composite events composed of multiple primitive events can be combined as well. The defined event scenarios of interest may be saved, e.g., into a well-formatted file, such as an XML file, which is then parsed and communicated to the tracking engines.

When multiple events are combined by, e.g., a SEQUENCE operation, a time interval can be defined among them. Thus, a spatio-temporal event detection on multiple cameras may be performed.

Aspects of the present embodiments will now be described in greater detail.

EVENT DEFINITION LANGUAGE: An event definition method may include a hierarchical, layered structure, and the method preferably uses a language which is generic enough to cover complex events and flexible enough so that it can be extended if/when necessary. The complexity of events is increased by connecting simpler, lower-level events by different operators. The first-level events are the basic building blocks, and are called the "primitive events". The existing operators may include, e.g., SEQUENCE, AND, OR, REPEAT-UNTIL and WHILE. This structure makes the illustrative method very flexible and extendable. New primitives and operations can be added without affecting the existing system.

The primitive events, their parameters and the operators used in the event definitions will now be illustratively described.

Figure 2:
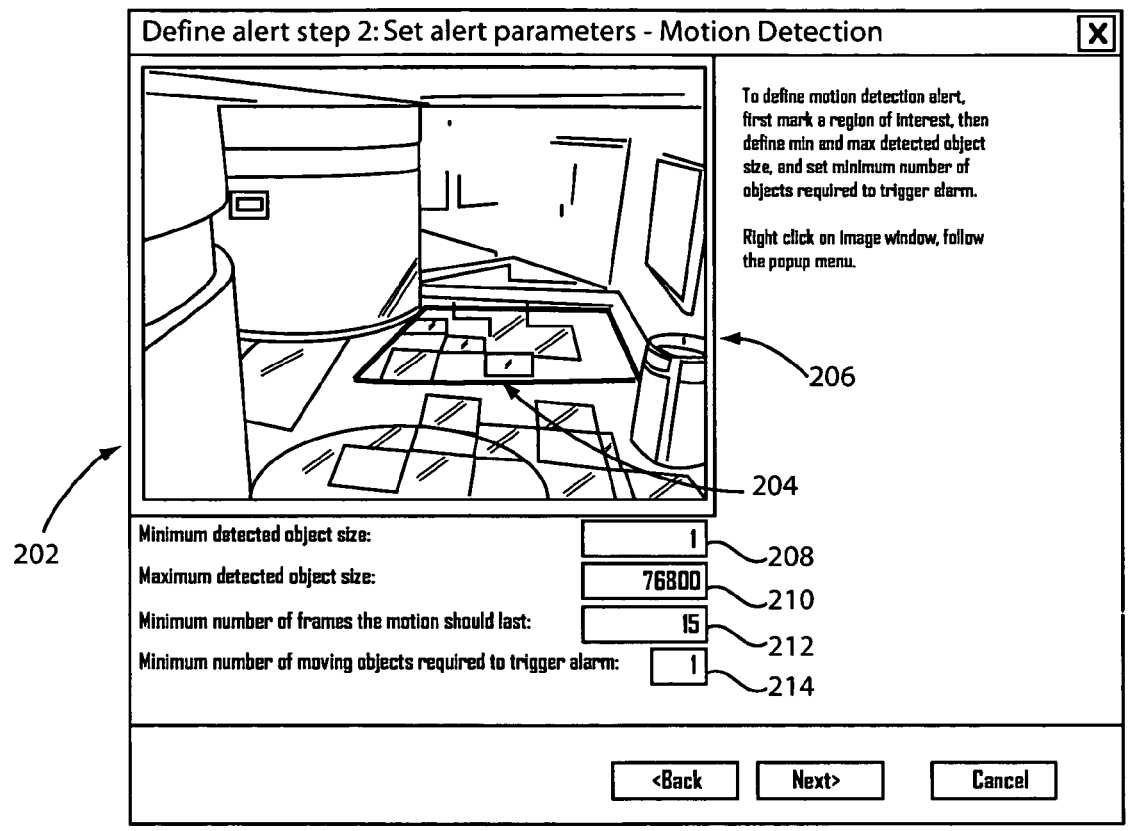
FIG. 2 shows a graphical interface for setting parameters for motion detection in accordance with one illustrative embodiment.
Figure 3:
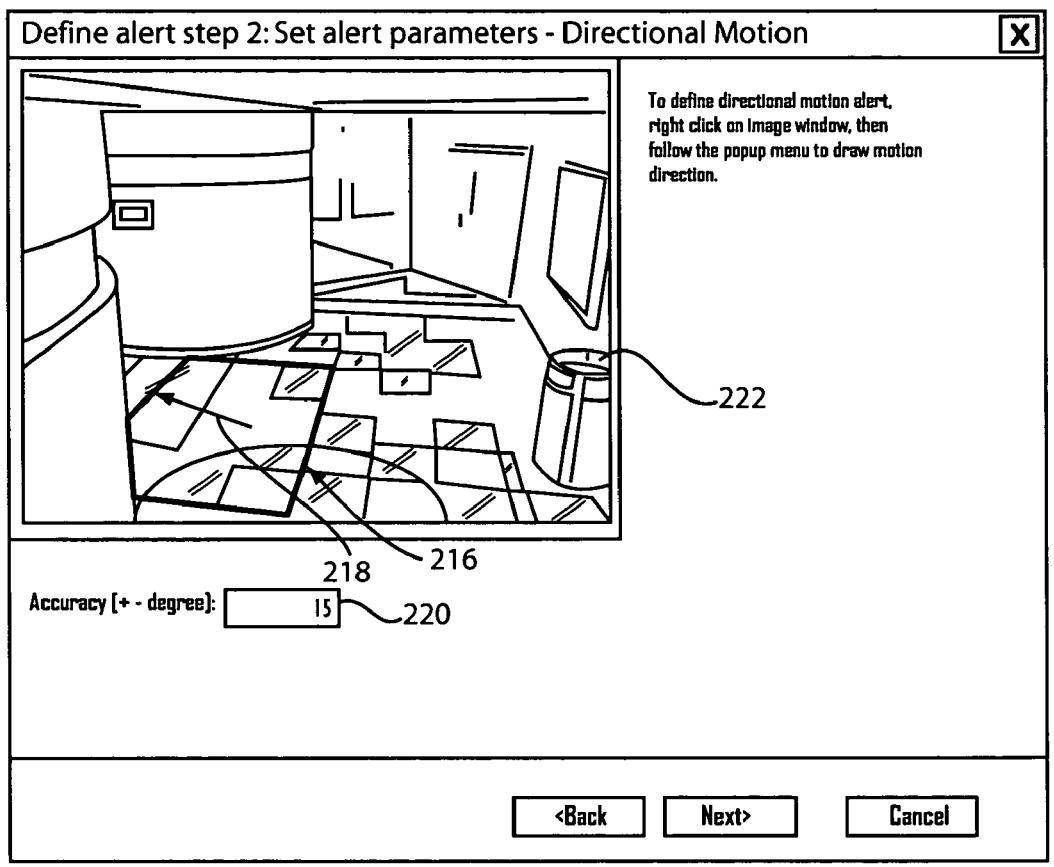
FIG. 3 shows a graphical interface for setting parameters for directional motion detection in accordance with one illustrative embodiment.
Figure 4:
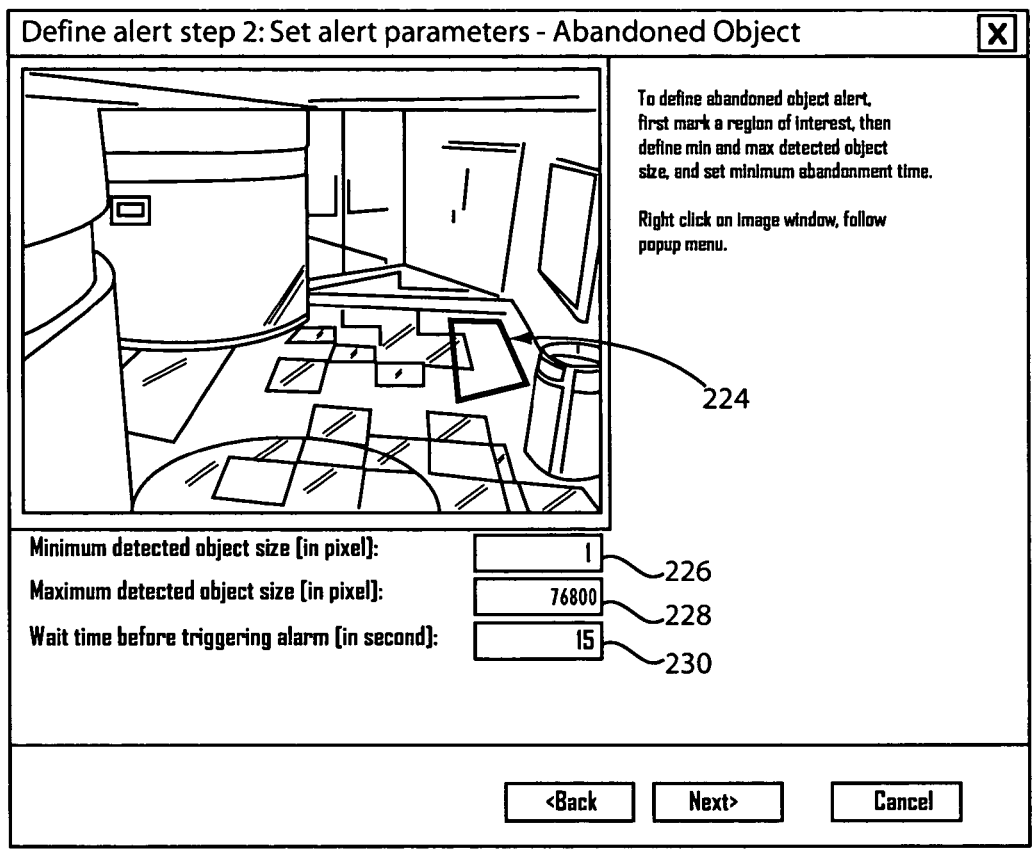
FIG. 4 shows a graphical interface for setting parameters for an abandoned object in accordance with one illustrative embodiment.
Figure 5:
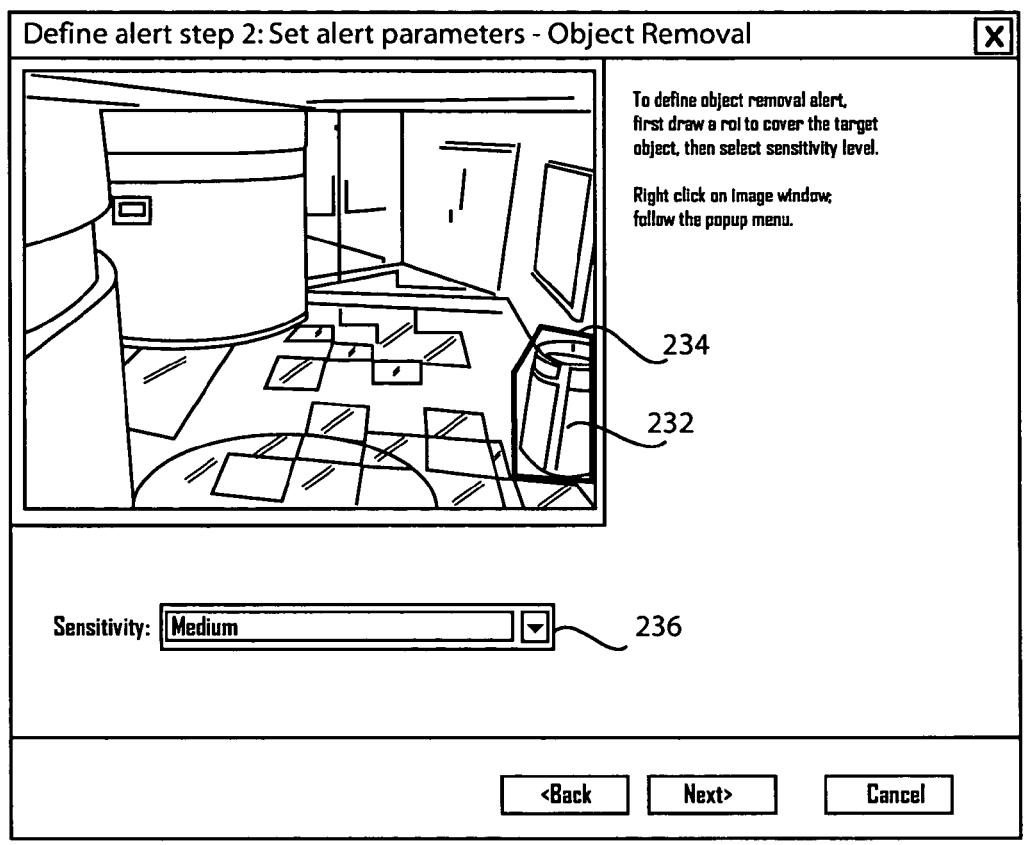
FIG. 5 shows a graphical interface for setting parameters for object removal in accordance with one illustrative embodiment.
Figure 6:
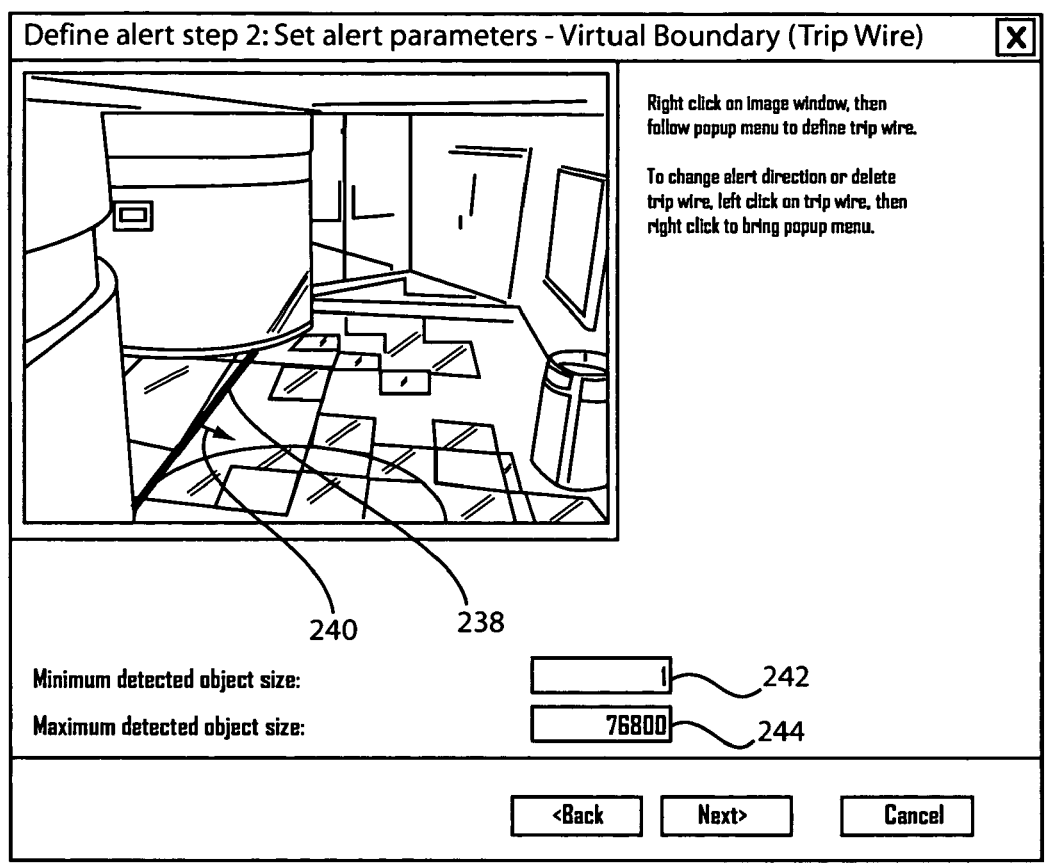
FIG. 6 shows a graphical interface for setting parameters for a boundary/trip wire in accordance with one illustrative embodiment.

Basic Building Blocks—Primitive Events: In one embodiment, six primitive events are illustratively employed. These include:

a) Motion detection in a region of interest (roi): With this event, an alert is generated when motion is detected in a region satisfying the selected parameter values. The parameters may include: a region of interest, a minimum detected object size, a maximum detected object size, a minimum number of frames the motion should last, and a minimum number of moving objects needed to trigger an alarm. FIG. 2 shows a window 202 where the parameters for the motion detection are entered into the system in accordance with this illustration. A region of interest 204 is selected in an image panel 206 on an interface 207. Then, a user enters the parametric information in appropriate areas. E.g., a minimum detected object size 208, a maximum detected object size 210, a minimum number of frames the motion should last 212, and a minimum number of moving objects needed to trigger an alarm 214.

b) Directional motion in a region of interest: For this primitive event, an alert is generated when motion is detected in the selected region and in a defined direction. The parameters may include: a region of interest 216, a direction of motion 218 in that region, and a tolerance 220 in direction in terms of angle. FIG. 3 shows a window 222 where the parameters for the directional motion are entered into the system.

c) Abandoned object: In this event definition, an alert is generated when an object satisfying desired parameters is left in a selected region 224. FIG. 4 shows interface 207, which permits the entry and set up of these parameters. The parameters may include a region of interest 224, a minimum detected object size 226 and a maximum detected object size 228, and a wait time before triggering the alarm 230.

d) Object removal: FIG. 5 shows interface 207 where parameters are input to set an alert when an object 232, selected by drawing a region 234 around the object, is removed. The parameters may include the region drawn around object 234, and a sensitivity level 236.

e) Trip wire: FIG. 6 shows interface 207 where parameters are input to set an alert when a line 238 drawn is crossed in a selected direction 240. The parameters may include the line of interest 238, the direction of crossing 240, and a minimum object size 242 and a maximum object size 244.

f) Camera blind/camera moved: FIG. 7 shows interface 207 where parameters are input to detect if/when the camera is moved or blinded. These parameters may include camera movement sensitivity 246 and a minimum pre-event video recording time 248.

Operators are employed to build higher-level, more complex event definitions. Operators connect simpler events by defining a relation between the events. Depending on the operation used, the operation may have its own parameters that can be customized.

Five illustrative operators are presented for an understanding of the present system. However, other operators may be added and configured in accordance with present principles.

1) AND operator: This operator connects the events (which are the operands) so that an alert is generated when BOTH events are detected. The order that the events happen is not important with this operator.

2) OR operator: With this operator, an alert is generated when either of the events is detected.

Figure 8:
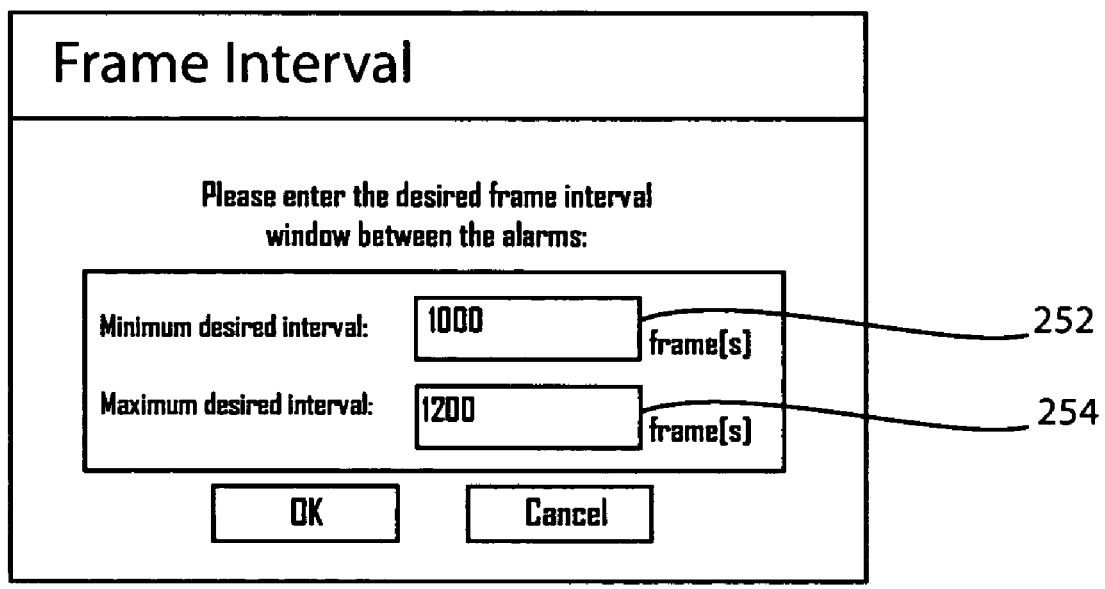
FIG. 8 shows a graphical interface for setting frame/time intervals for a plurality of different operations in accordance with one illustrative embodiment.

3) SEQUENCE operator: the most fundamental relation among component events is one of sequence. A composite event including event e1 followed by event e2 is fundamental. The event definition scheme herein covers the sequence concept by connecting the component events by the SEQUENCE operator. If a composite event is defined by using the SEQUENCE operator, an alert is generated when the events, that are operands, occur in the defined order. With the SEQUENCE operator, the user can also define and customize the time interval needed between the events. A minimum desired interval 252 and a maximum desired interval 254 can be defined by using a dialog window 250 as shown in FIG. 8. The dialog window 250 is presented to a user to define the minimum and maximum desired intervals (252 and 254) between the events in a sequence.

4) REPEAT-UNTIL operator: This operator builds the composite event of an iteration of event e1 happening until state e2 holds.

5) WHILE-DO operator: This operator is used to build a composite event where the second event is repeated as long as the first event is detected.

DEFINING THE EVENTS AND INTRODUCING THE EVENTS TO THE SYSTEM: An event definition language as described above provides a hierarchical, generic way of building customized, complex event definitions from simpler components. The ability to connect composite events among themselves provides a way of defining events that are higher and higher in semantic level and complexity.

In terms of actually defining the events and entering the events into the system, having a structured language is not necessarily enough. A way of communication between the user and the computer by using this language is also needed. For example, the user needs to define the events by using this language, and then enter them to the system in the most generic way. This communication procedure preferably should not require any technical knowledge (such as familiarity with programming languages), and every end-user should be able to use the language.

One way of providing ease of usage may be by forming the definitions in a text format as a code. For example, the event of "E1 happening after E2" can be defined as SEQUENCE (E2, E1). Then, the question is how to define the component events E1 and E2. Each primitive event can have its own parameter list, which can be filled in by the user. Defining the region of interest this way, for instance, would be very difficult without visual help. Defining events in this format would put most of the burden on the user, and require familiarity with functions and parameters etc. The end user would need to know the technicalities of the language. In the above example, the user needs to know that the SEQUENCE operation is defined by SEQUENCE(parameter1, parameter2), and in the parameter list of SEQUENCE he/she needs to write E1 as the second parameter if it is supposed to happen after E2, and not the other way around. Also to define the primitive events, the user needs to check what parameters to define, and enter the parameters one by one in the necessary order.

In addition, this format would heavily rely on the user doing things correctly. However, different users can enter the parameters in the wrong order, or may forget to input some required parameters in the text format.

Aspects of the present embodiments provide a more efficient, a more generic and a more user-friendly interface between the user and the computer. A novel, graphical user interface, where the user does not need to know the necessary parameters of the primitive events and the expressions to create composite events is herein described. The interface makes everything visual and lets the user define events on multiple camera views. In this way, the user can actually see what events he/she has been defining on which camera views with what relations. User mistakes, such as forgetting to define parameters, are virtually eliminated. The system makes the necessary checks, and when information is missing, the user is queried. Thus, as opposed to the text format above, the load is taken from the user and placed onto the system (e.g., computer), which also makes the present methods more reliable.

Another advantage of the created interface in accordance with the present principles is ease of use by any end user. The primitive events are created in a step by step manner, where the user is asked for different parameters at each step. The region of interest can be drawn on the selected camera view by using a mouse. When the definitions of primitive events are finished, the images of the camera views and the events defined on them are placed in different boxes on the screen, and they can be connected to each other via arrows or the like. This makes the whole procedure of connecting the events, and building a composite event very intuitive. The individual events and which operator they are connected with can be seen on the screen. This helps the user to see the composite event as a whole.

The following referenced FIGS. and accompanying description will be presented as a step by step illustration on an example graphical user interface (GUI). It should be understood that the appearance and positioning of buttons, regions and other areas on the screen may be arbitrarily determined by one skilled in the art. Therefore, the GUI presented is for illustrative purposes in demonstrating present principles.

Figure 9:
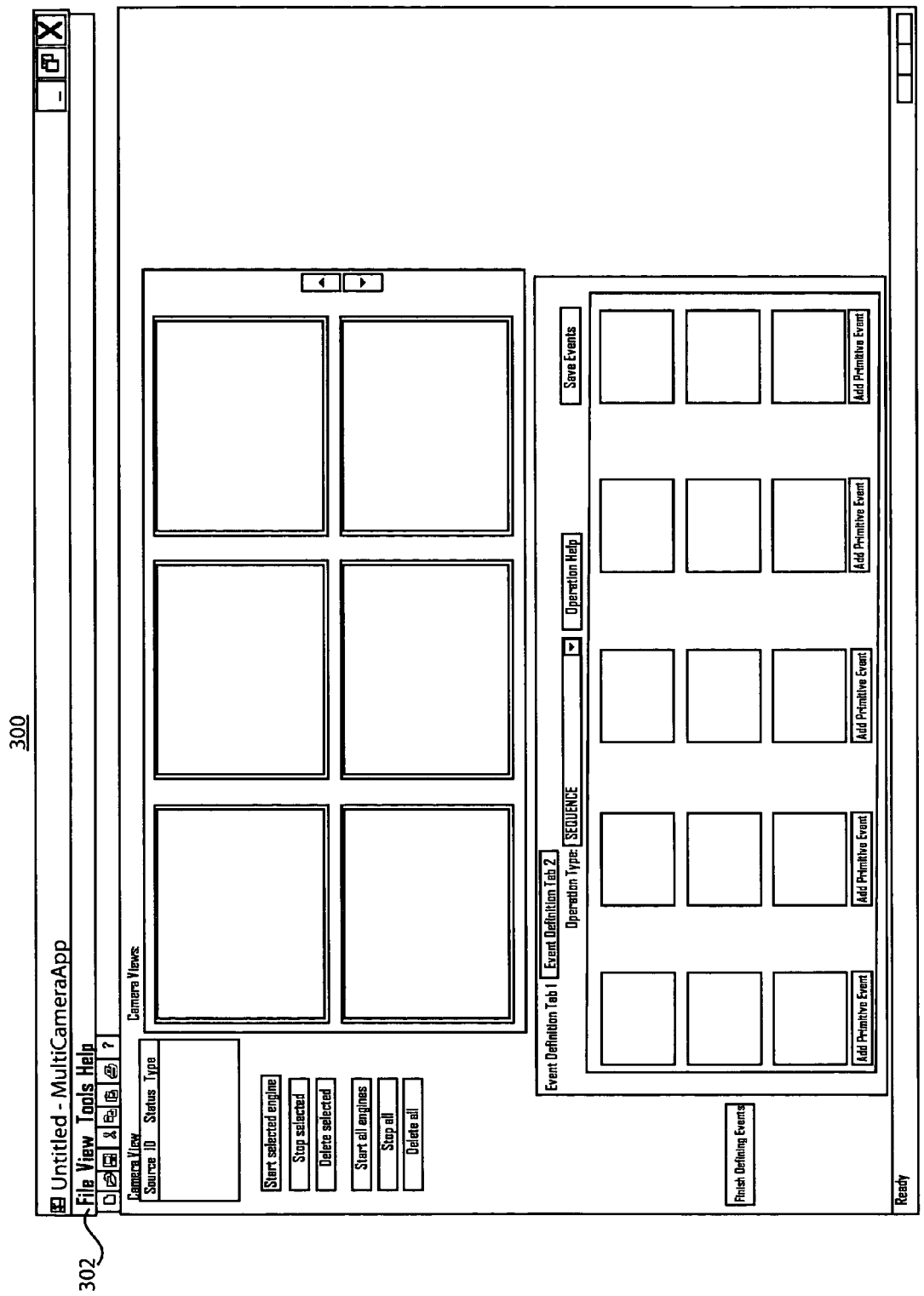
FIG. 9 shows a graphical user interface for organizing camera monitoring and for setting up composite event relationships in accordance with one illustrative embodiment.
Figure 10:
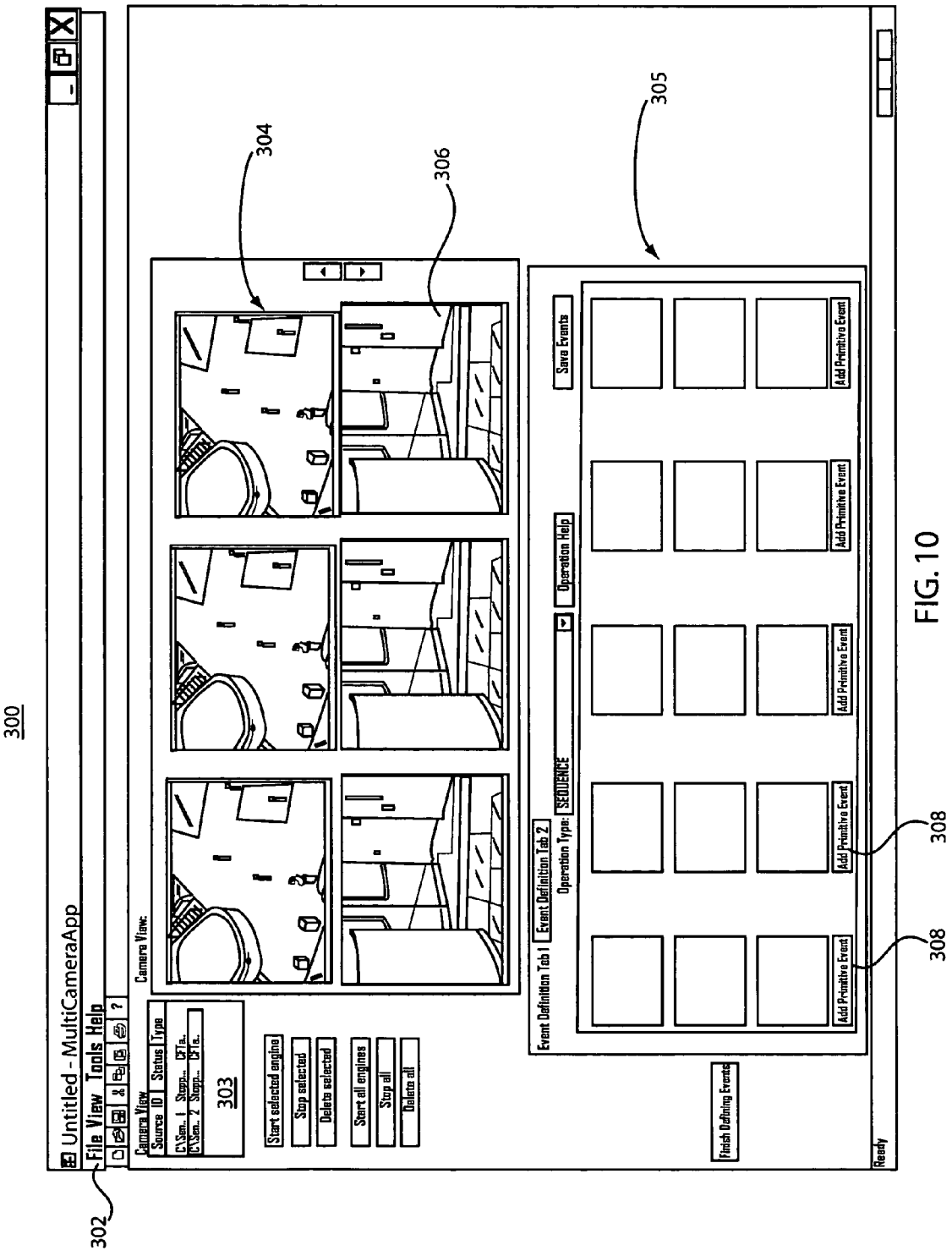
FIG. 10 shows the graphical user interface of FIG. 9 including camera views and a camera list in accordance with one illustrative embodiment.

Referring to FIG. 9, a graphical user interface 300 is provided showing an initial view of the interface when the program is executed. The user can open videos from multiple camera views by using a "File" menu item 302 or equivalent. In FIG. 10, the appearance of the interface 300 is shown after two different videos are opened in areas 304 and 306. As can be seen in FIG. 10, when the user selects a camera view from a list 303 on the upper left hand corner, a rectangle is drawn around the image of the selected view to show the user which view he/she will be working on and what it looks like. A bottom half 305 of the program window is an ActiveX™ control. This control is used to define composite events and enter them to the system in a generic and flexible way. As it is an ActiveX control, it may be used for event definition on a webpage as well.

If the user wants to perform an offline search, the user can define the events of interest on a webpage by using this control, and then the primitive events saved in an event database can be searched to see if the defined composite event has happened. Thus, the system makes both live and offline event detection possible.

In the event definition method, composite events are composed of basic building structures which will be called "primitive events" or simply primitives. The event definition procedure may be divided into three steps: 1) defining the primitive events (operands), 2) choosing an operation to connect the primitives with, and 3) connecting the primitives via arrows provided by the interface 300.

The procedure can be illustrated with an example. Let the event scenario of interest be a person going through main lobby doors and then going outside a building in an interval of 1000 to 1200 frames. This event can be described by two primitive events and a SEQUENCE operator. The event can be described as a trip wire event in view of the lobby door camera followed by a motion detection event in view of an outside camera. Thus, a user begins by choosing the view of the lobby door camera from the camera list 303. Then, on the ActiveX control 305, the user presses "Add Primitive Event" button 308. This means that the user wants to define a primitive event on the view of the lobby door camera. Once this is done, the user is presented with a series of windows 310 for primitive event definition. These windows are illustratively displayed in FIGS. 11 through 15.

Figure 11:
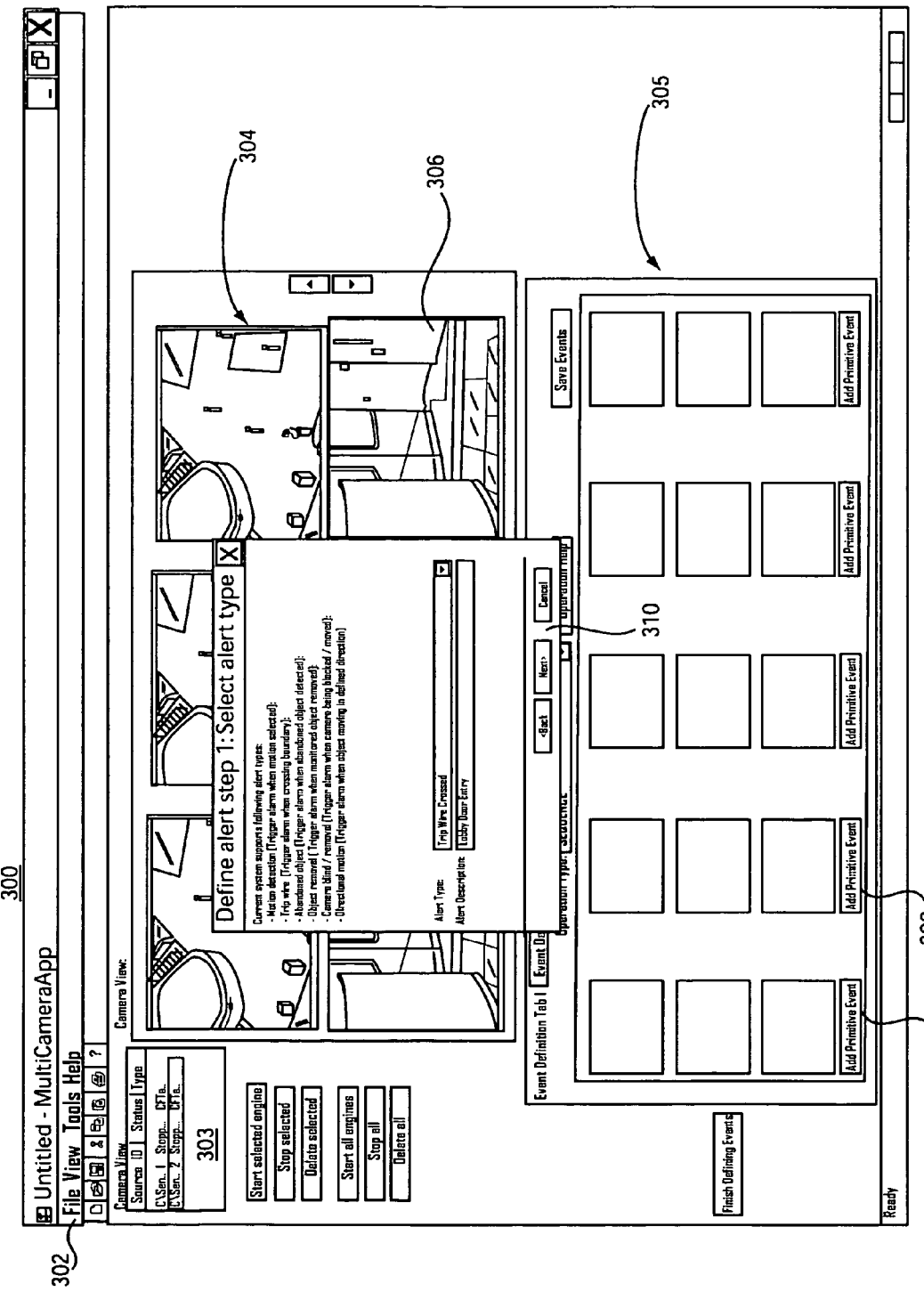
FIG. 11 shows the graphical user interface of FIG. 10 with a pop-up window for selecting an alert type in accordance with one illustrative embodiment.
Figure 12:
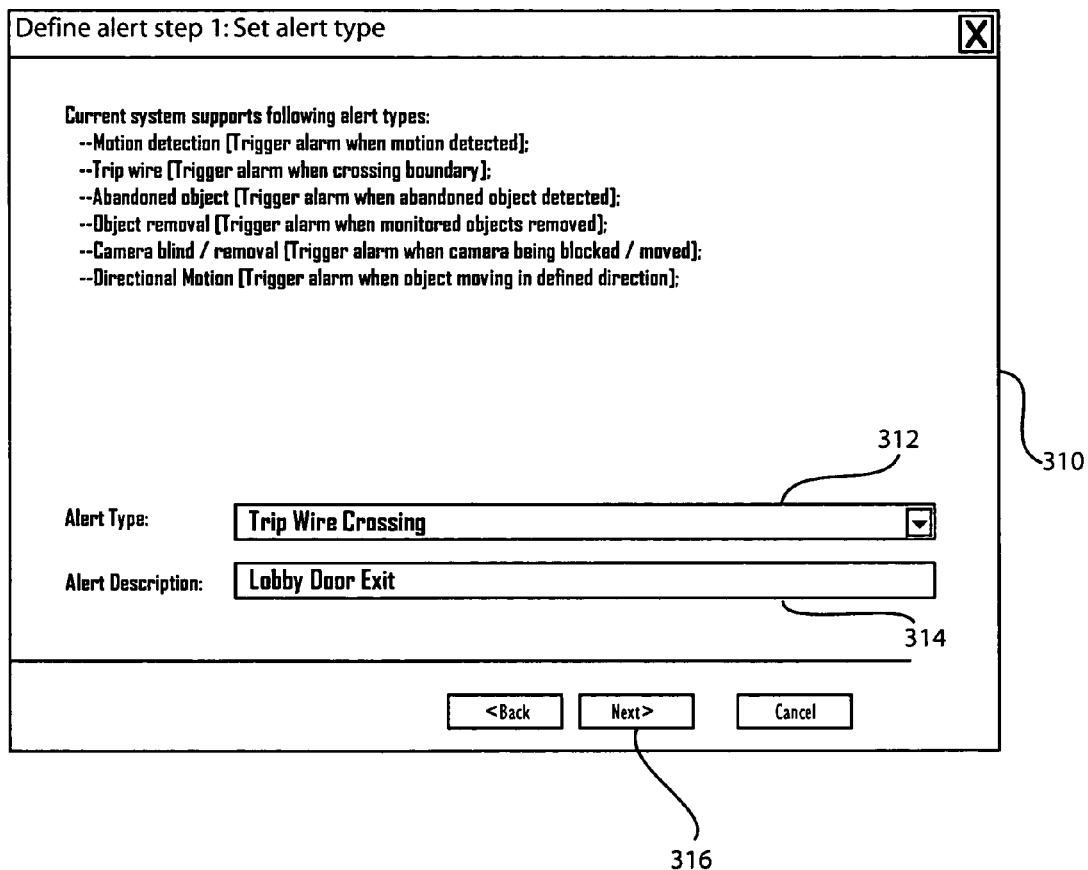
FIG. 12 shows the pop-up window of FIG. 11 for selecting an alert type in accordance with one illustrative embodiment.

Referring to FIG. 11, a screen shot is shown for what is presented when the "Add Primitive Event" button 308 is selected. FIG. 12 is the enlarged version of the window for a first step of the primitive event detection. The user selects the desired primitive event from an "Alert Type" list 312 and gives an optional description for the alert type in block 314. In this case, the primitive event chosen is "Trip Wire Crossing" and the description given for it is "Lobby Door Exit". When the "Next>" button 316 is pressed, the user is presented with a window 318 (FIGS. 13A-F) for a second step of the primitive event definition.

Figure 13A:
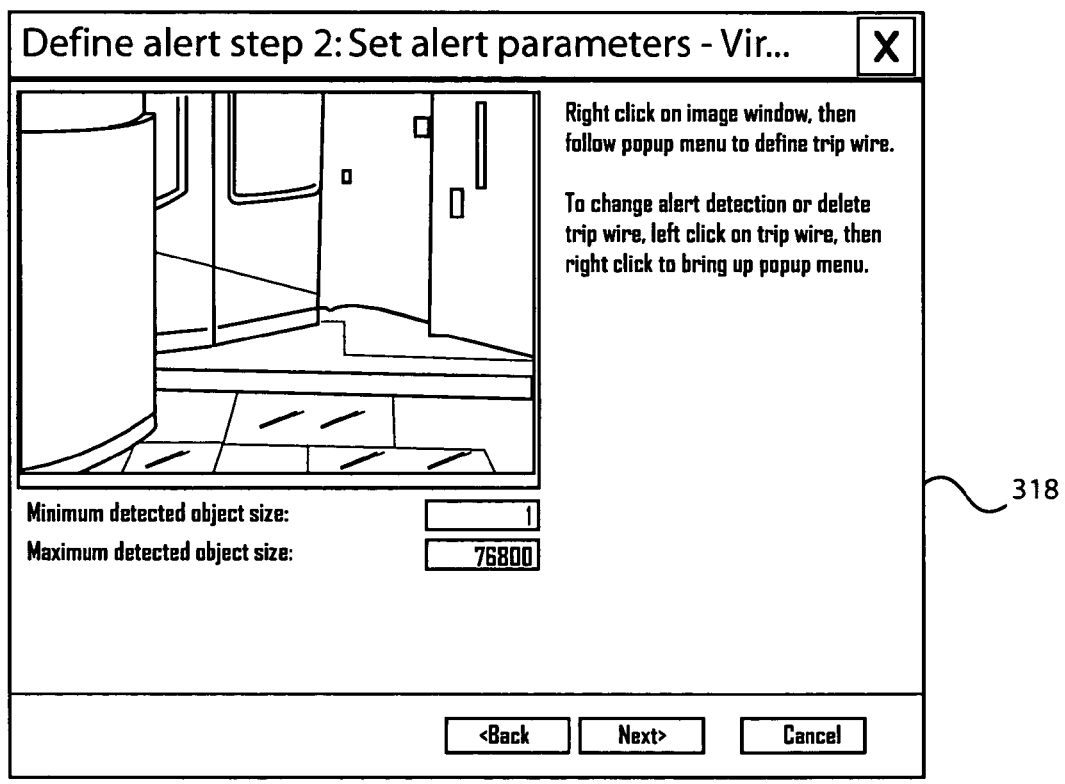
FIGS. 13A-13F show windows for each step in setting up parameters graphically and textually for a trip wire primitive in accordance with one illustrative embodiment.
Figure 13B:
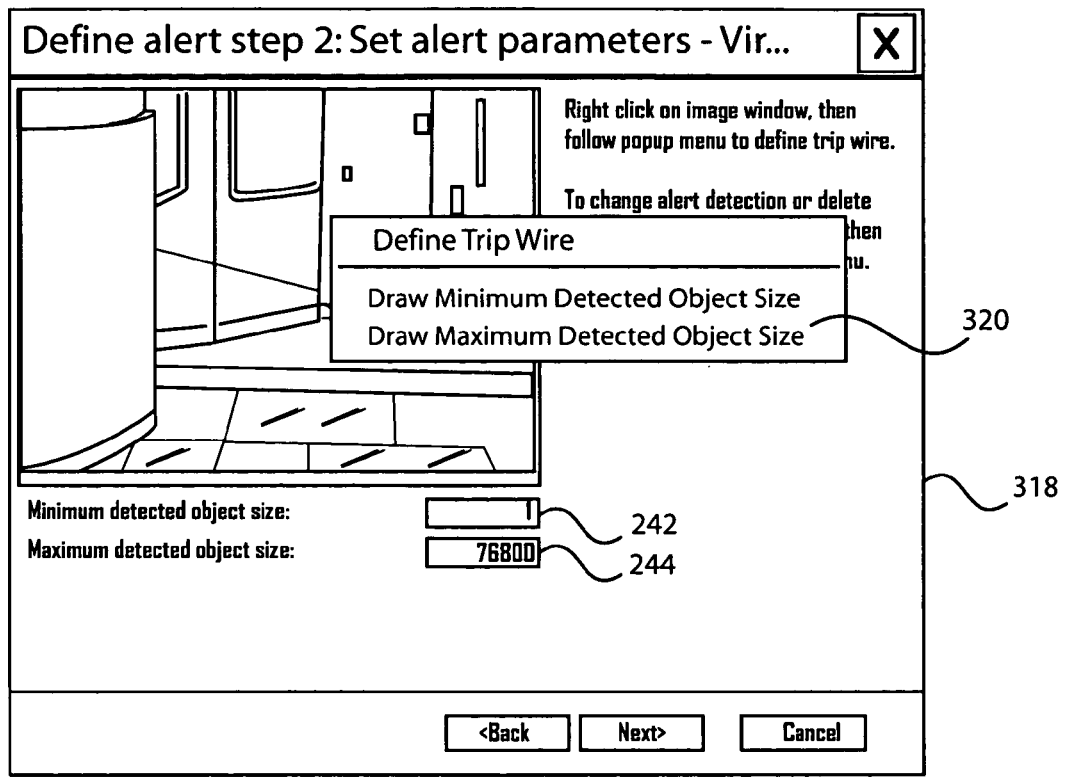
Figure 13C:
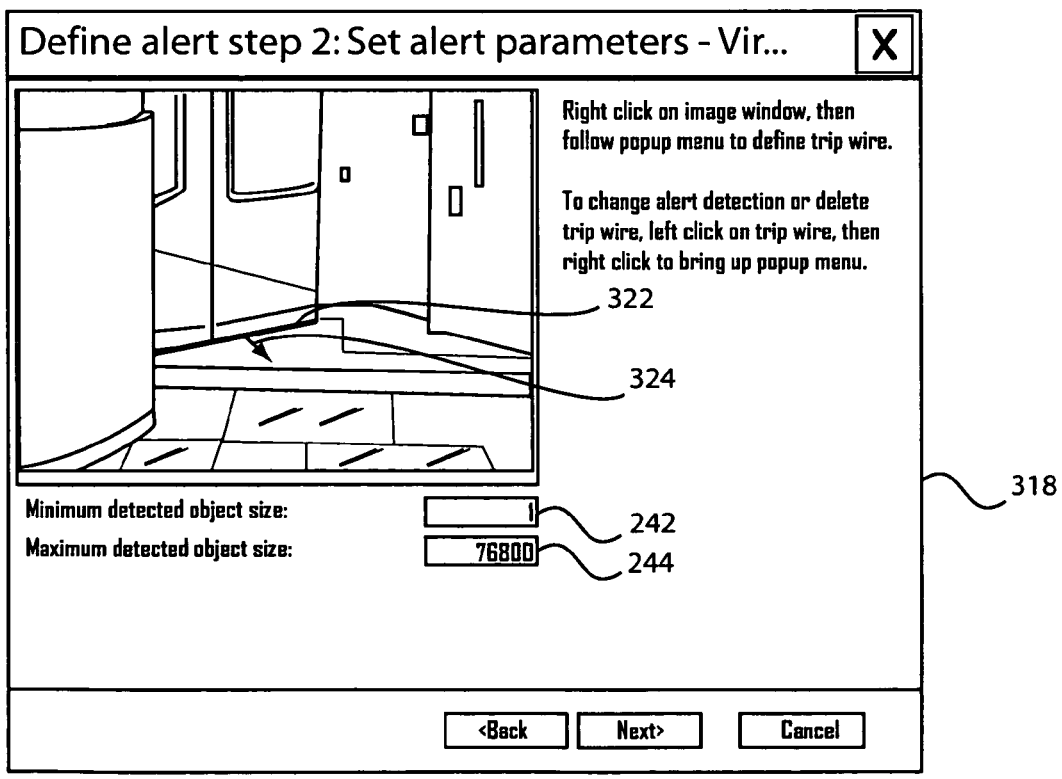

When the user right clicks on the image window (or performs an equivalent action), a pop-up menu 320 is displayed as shown in FIG. 13B. If the "Define Trip Wire" option is chosen, the user can draw a desired trip wire 322 on the camera view by using a mouse or other control feature. The wire 322 drawn by the user is displayed, and a default for a wire crossing direction 324 is set to be the both directions as indicated in FIG. 13C. This wire 322 can be selected by left clicking on it, and once selected the wire 322 is displayed in a different color or texture to indicate it is active as indicated in FIG. 13D.

Figure 13D:
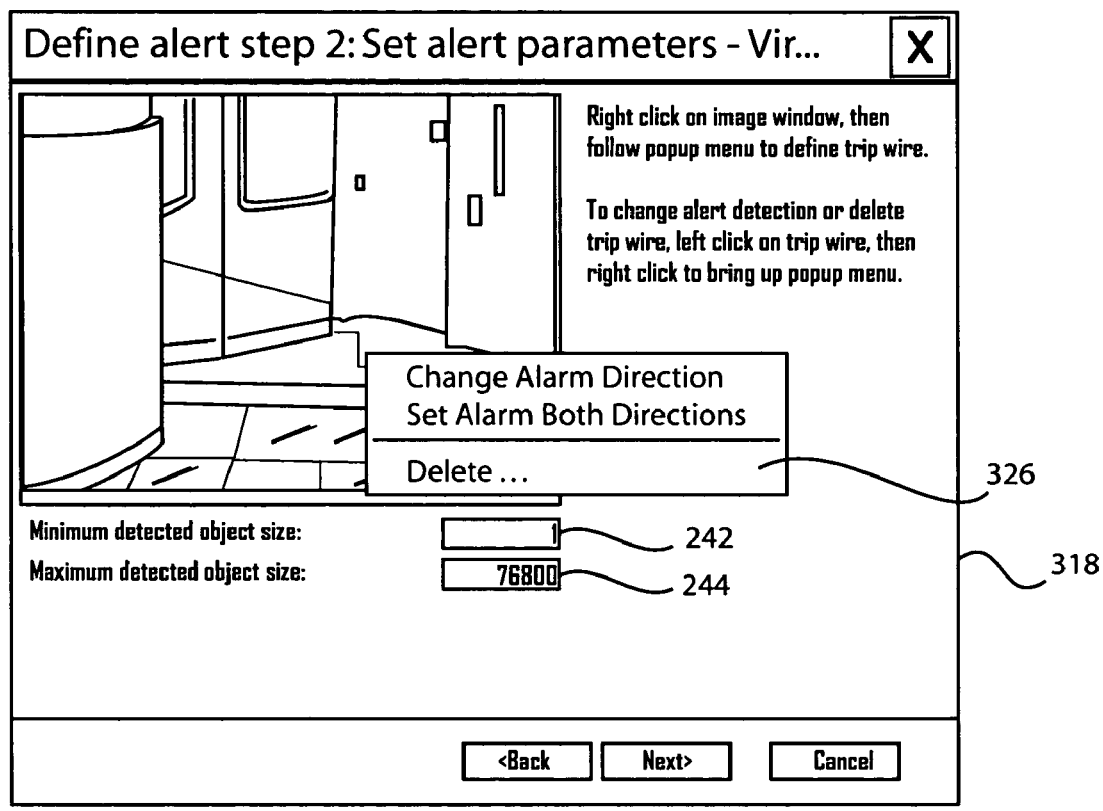

If the user right clicks on the mouse when the wire 322 is selected, a pop-up menu 326 shown in FIG. 13D is displayed. By this menu, the user can choose the any crossing direction desired or delete the wire 322.

Figure 13E:
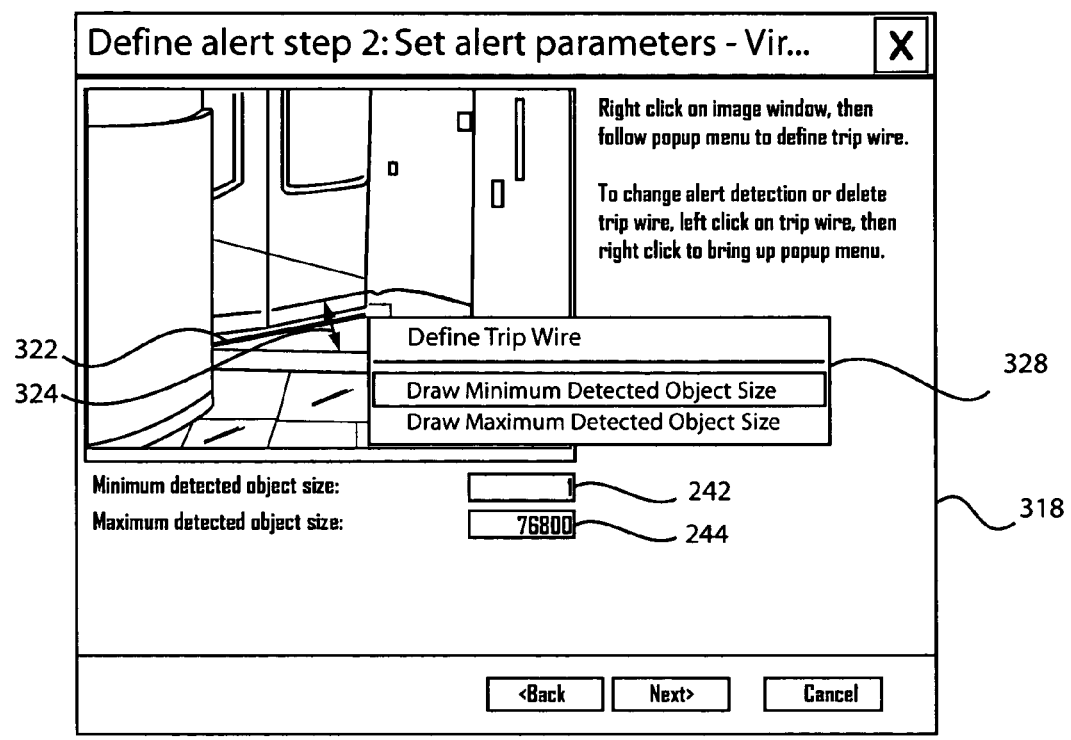
Figure 13F:
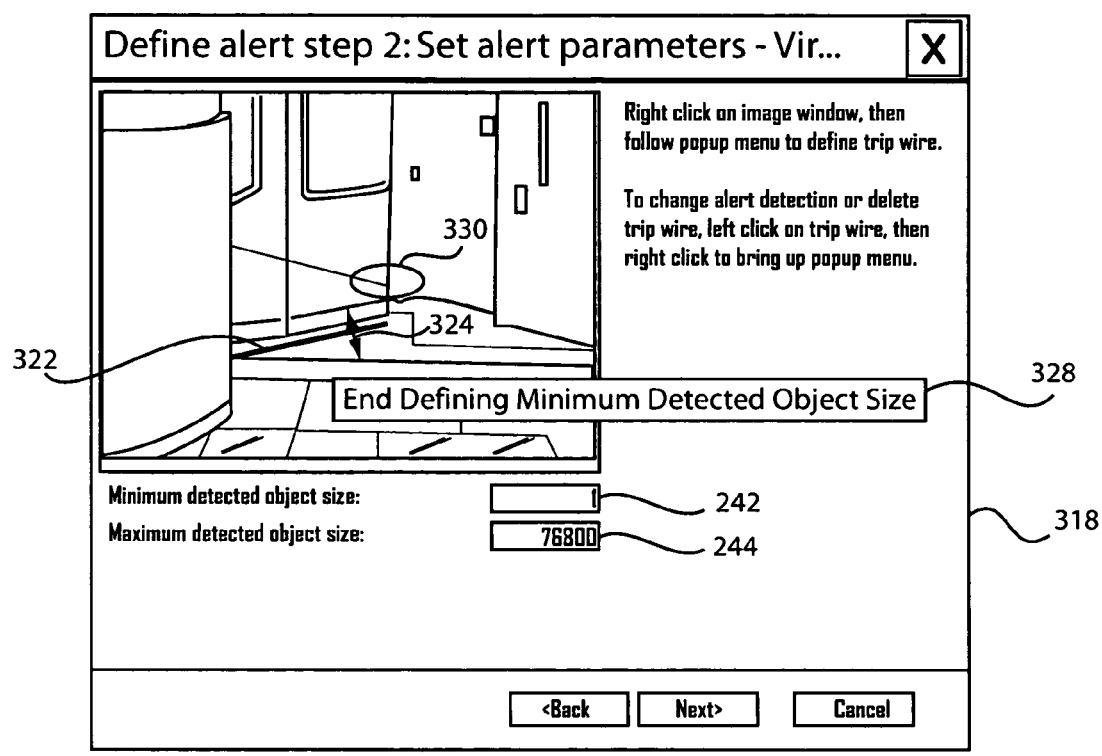

Referring to FIG. 13E, another function provided with this system is the ability to draw the desired object sizes on the camera view. By following a popup menu 328, the user can select "Draw Minimum Detected Object Size" or "Draw Maximum Detected Object Size" and can draw an ellipse (or other shape) by using the mouse or other means. In FIG. 13F, an area of an ellipse 330 is set to be the minimum or maximum object size. This means that the trip wire alert will be generated only if the size of the object crossing the wire 322 is within these drawn size limits. FIGS. 13E and 13F illustrate the size drawing procedure.

Figure 14:
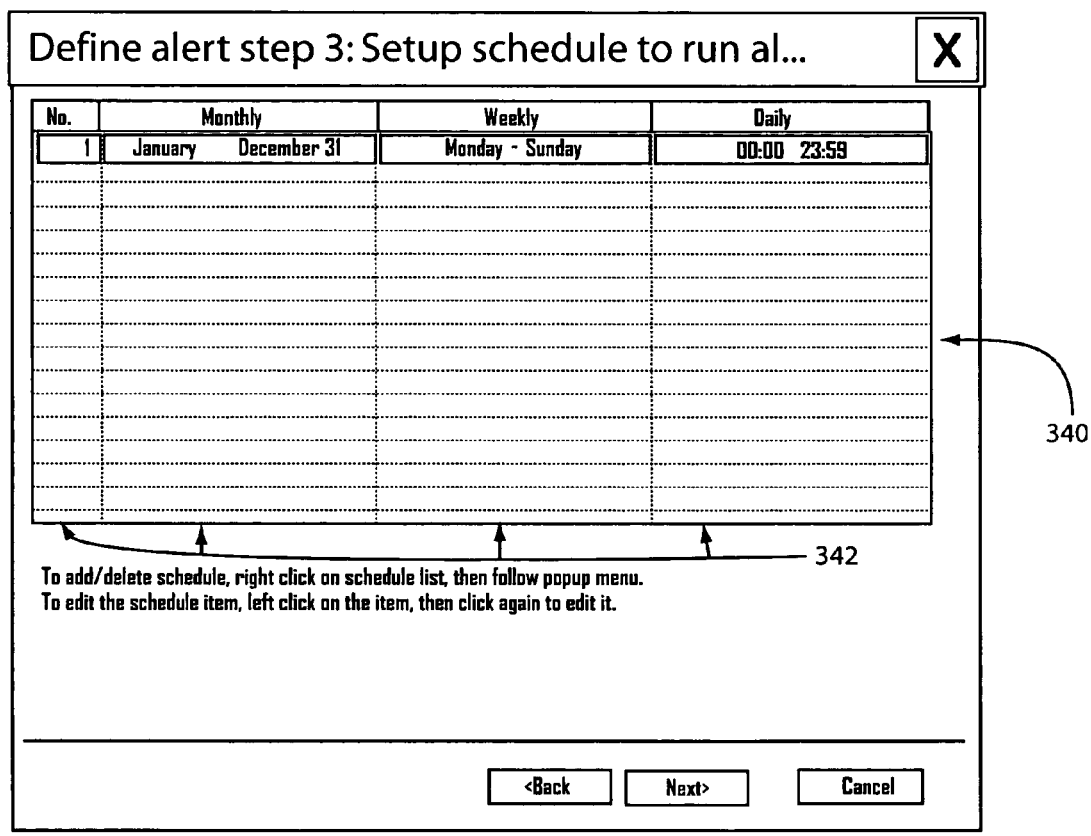
FIG. 14 shows a setup schedule for monitoring cameras in accordance with one illustrative embodiment.
Figure 15:
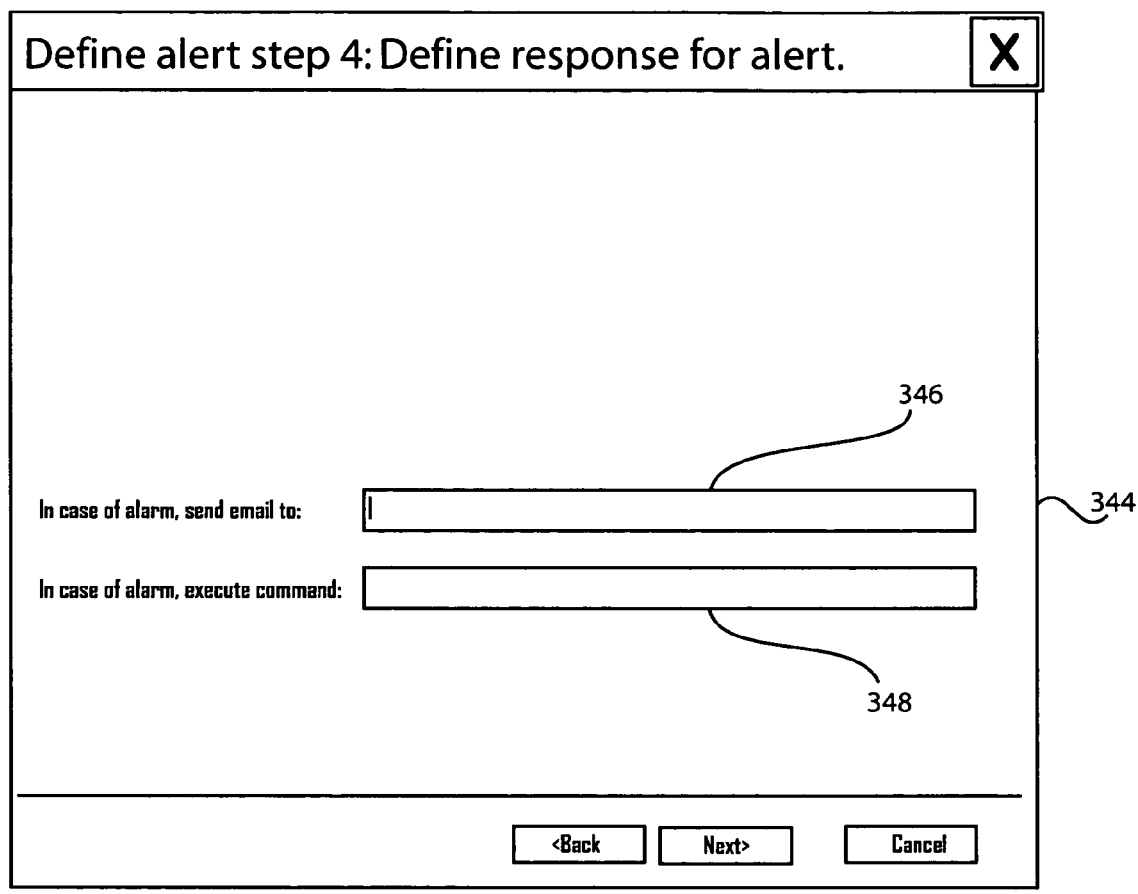
FIG. 15 shows a graphical user interface for defining a response for an alert in accordance with one illustrative embodiment.

FIG. 14 shows a next step in the primitive event definition. In this step, the user can setup a schedule 340 to run event detection. FIG. 14 shows columns 342 where time and date information may be entered for each event detected that satisfies the defined criteria. FIG. 15 shows a window 344 presented to the user for another step for primitive event definition, where the user defines actions to take in case the event is detected. In fields 348, the user can enter a command to execute in case of the event detection. In field 346, an e-mail address may be indicated to provide a contact in case of the event detection. Other actions may be defined and/or used in combinations.

Figure 16:
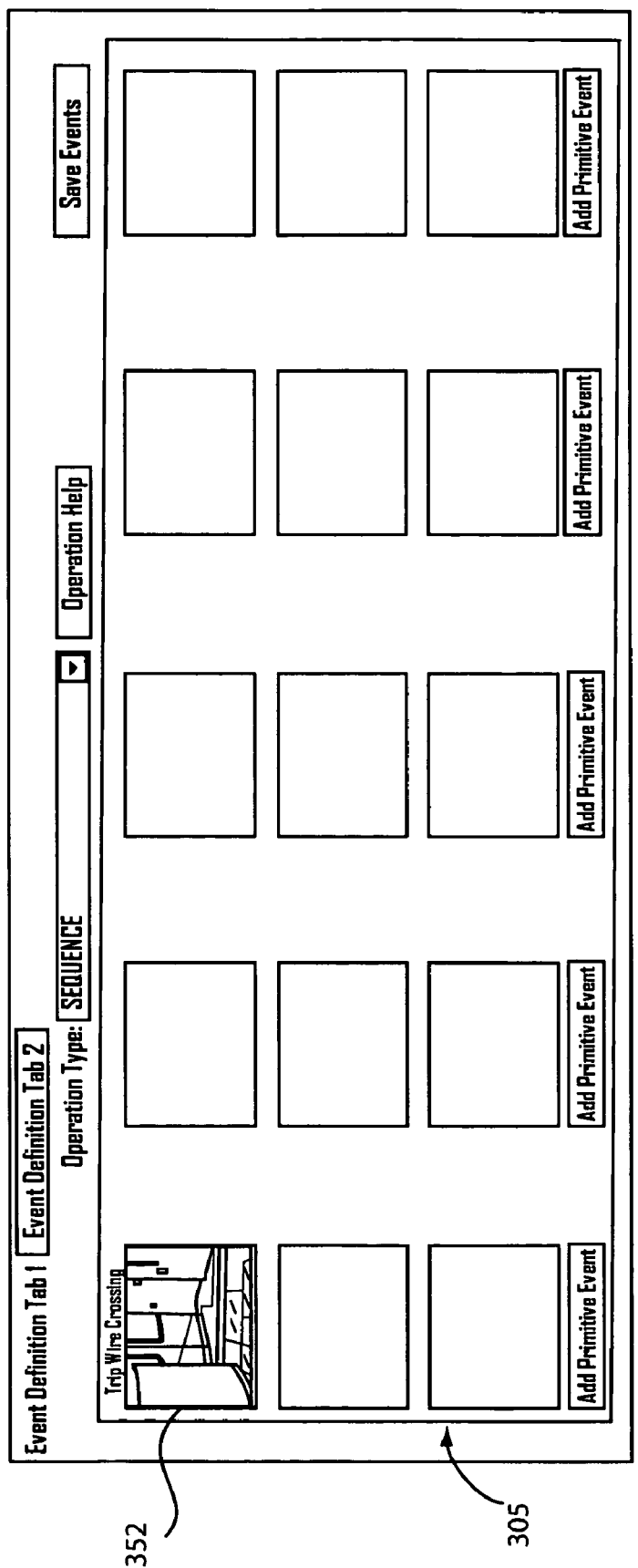
FIG. 16 shows a graphical user interface for an ActiveX control portion for organizing primitives in accordance with one illustrative embodiment.
Figure 17A:
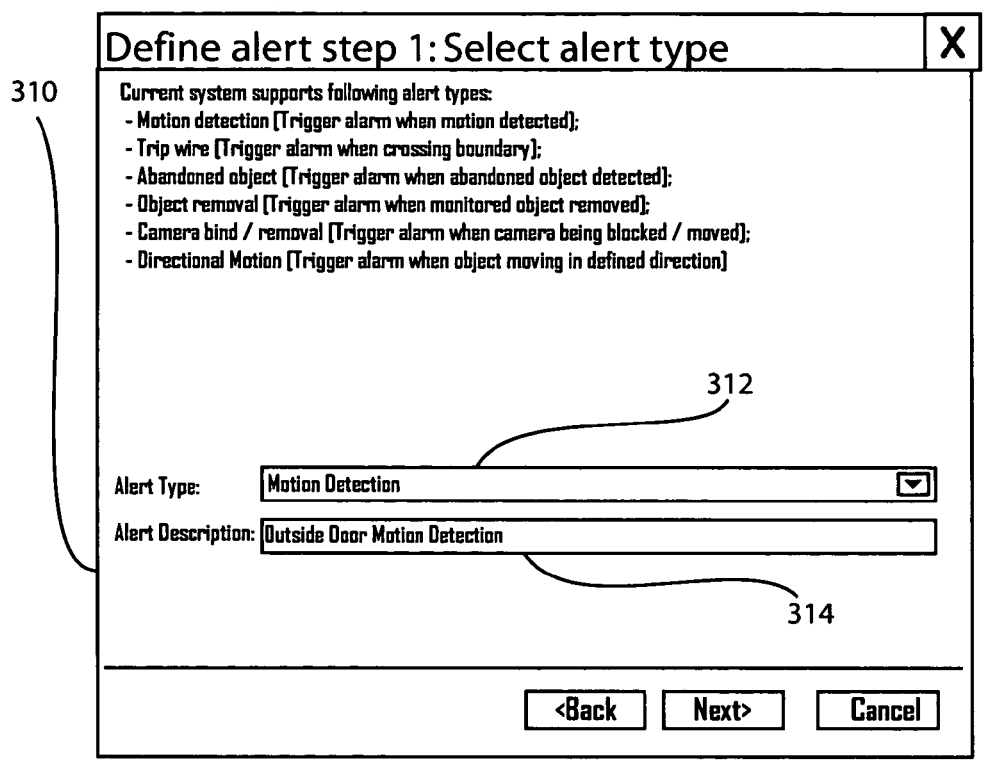
FIGS. 17A-17D show windows for each step in setting up parameters graphically and textually for a motion detection primitive in accordance with one illustrative embodiment.
Figure 17B:
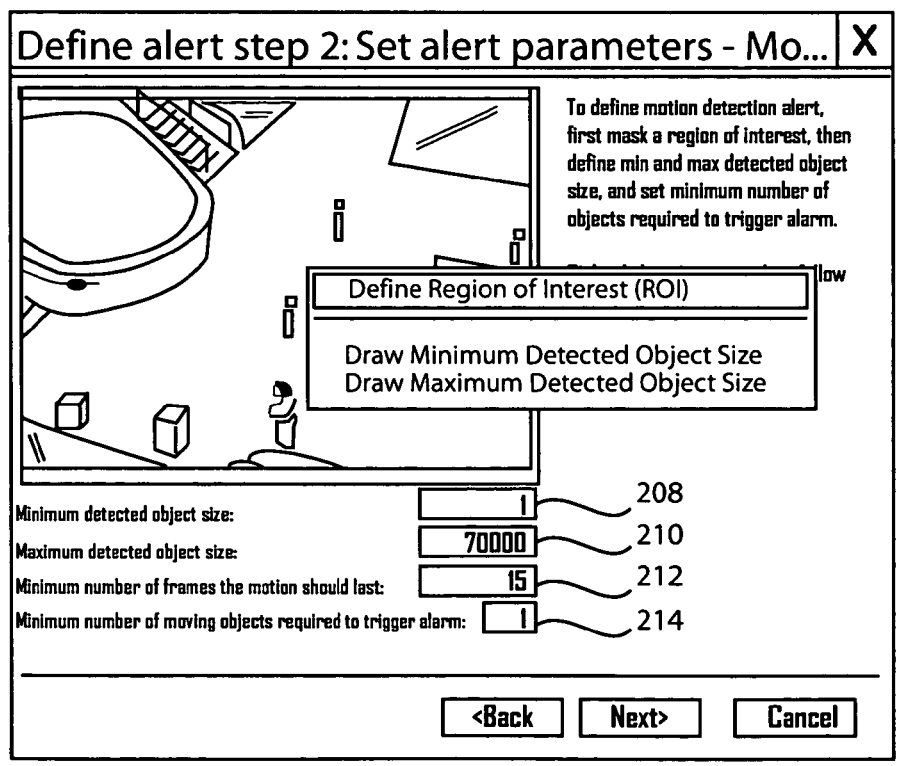
Figure 17C:
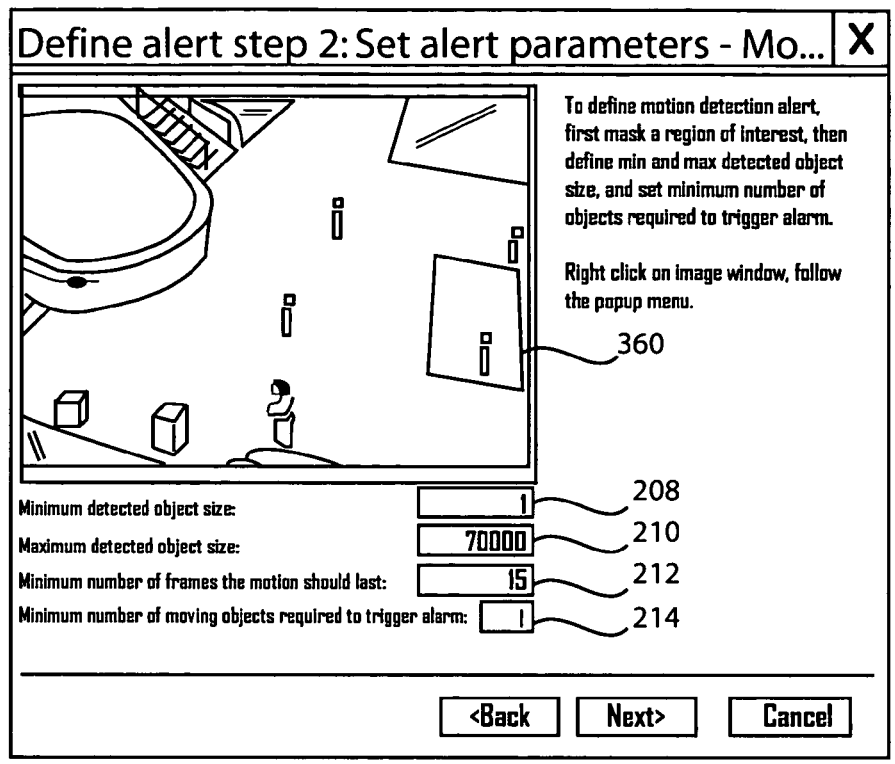
Figure 17D:
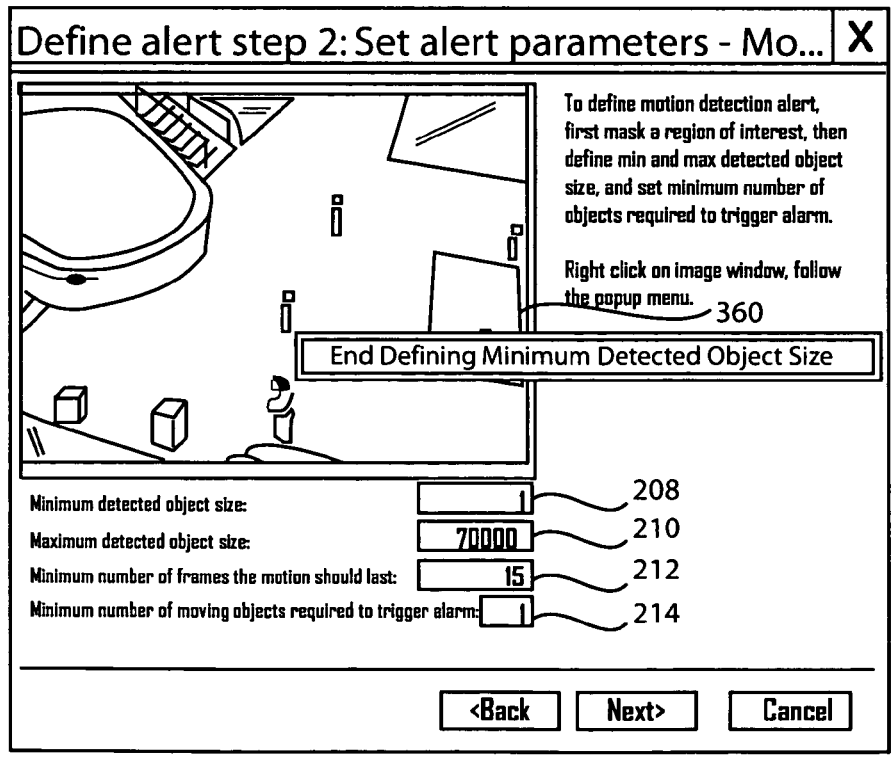

When a "Finish" button 350 is pressed at this step of the primitive event definition, the event defined is displayed, together with a camera view the event is defined on, in the ActiveX control 305 as shown in FIG. 16. In FIG. 16 a panel 352 indicates the event definition (trip wire) in the actual camera view. In this way, the user can see the defined event.

Figure 18:
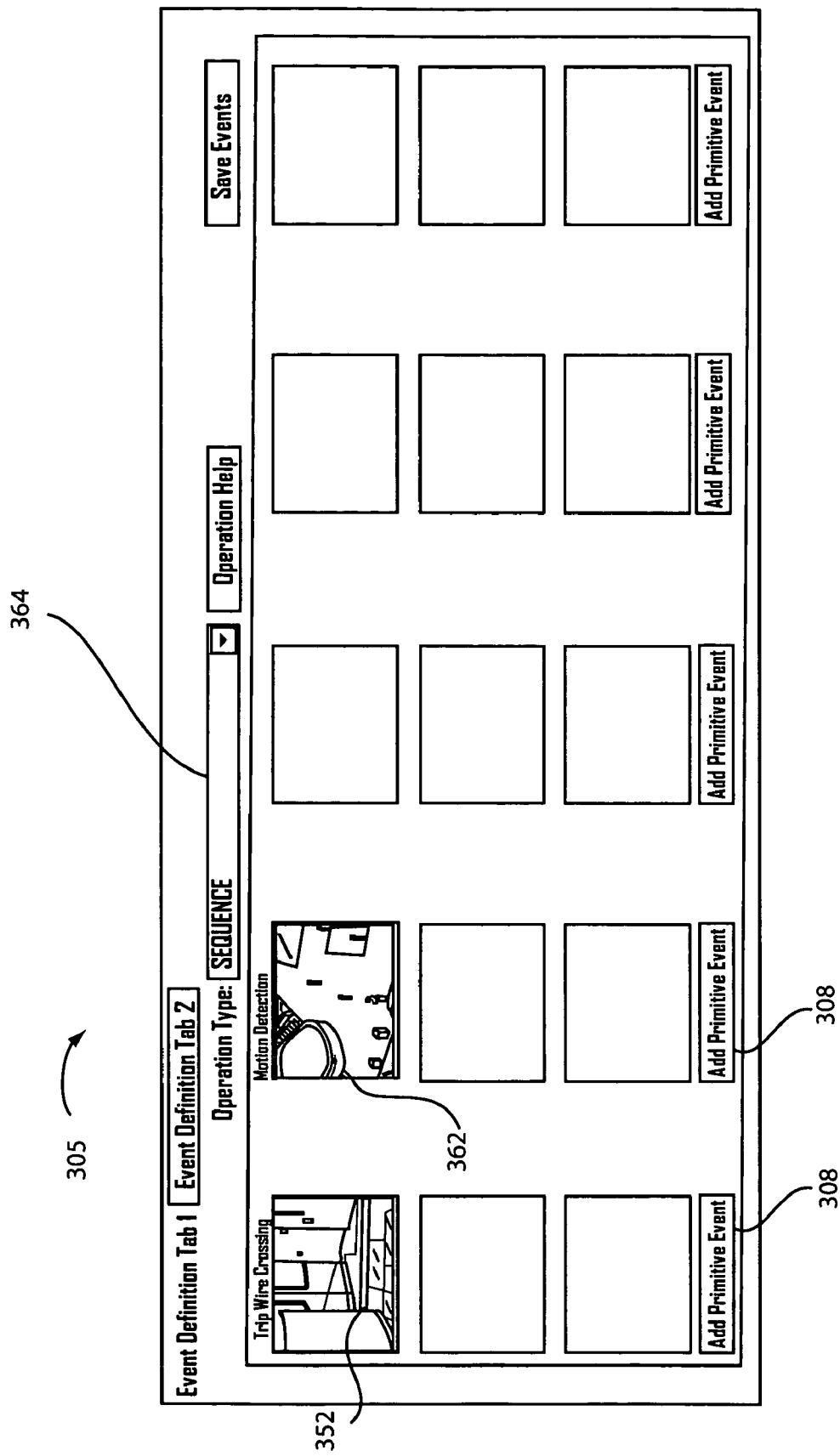
FIG. 18 shows the graphical user interface of FIG. 16 with a primitive for motion detection added in accordance with one illustrative embodiment.

Another illustrative example will define a motion detection event on a view of the outside camera. Similar to the above example, the user first chooses the view of the outside camera from the camera list 303 (FIG. 10), and then presses "Add Primitive Event" button 308 on the ActiveX control 305 (FIG. 10). After this, the primitive event definition steps, which are similar to the above steps, are followed. This time, instead of "Trip Wire Crossing", the "Motion Detection" primitive is selected from the "Alert Type" list 312, and in the second step, where the alert parameters are set in fields 208-214, the parameters for the "Motion Detection" event are asked from the user. For instance, the user enters a region of interest 360 by drawing it on the camera view with mouse clicks. Example screen shots of these steps are illustrated in FIGS. 17A-17D. When this definition is finished, the definition is displayed in a panel 362 in the ActiveX control 305 as well, as shown in FIG. 18.

Once all the primitives (operands) are defined, the next step is to connect them with the desired operator. The operation type can be selected from a drop down menu 364 on the upper part of the ActiveX control interface 305. In the example scenario, the operator that will be used is the "SEQUENCE" operator.

Figure 19:
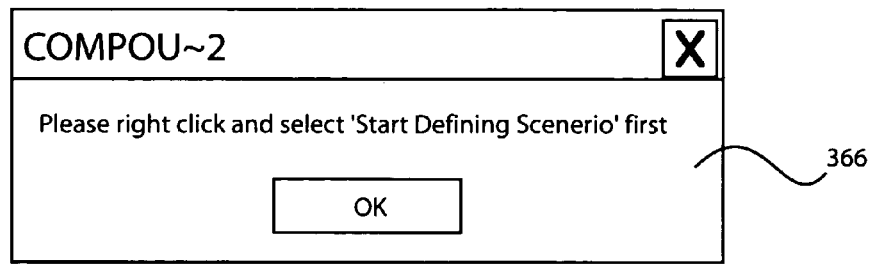
FIG. 19 shows a warning screen to direct a user to properly operating the graphical user interface in accordance with one illustrative embodiment.

After the operator is selected, the user right clicks and selects "Start Defining Scenario" from a popup menu. As it is the case with the system, if the user tries to click on one of the existing primitive events first, he/she is presented with a window 366, which is shown in FIG. 19, reminding the correct action to take. After clicking on "Start Defining Scenario" on the popup menu, the user can connect the defined primitive events by using the mouse.

Figure 20:
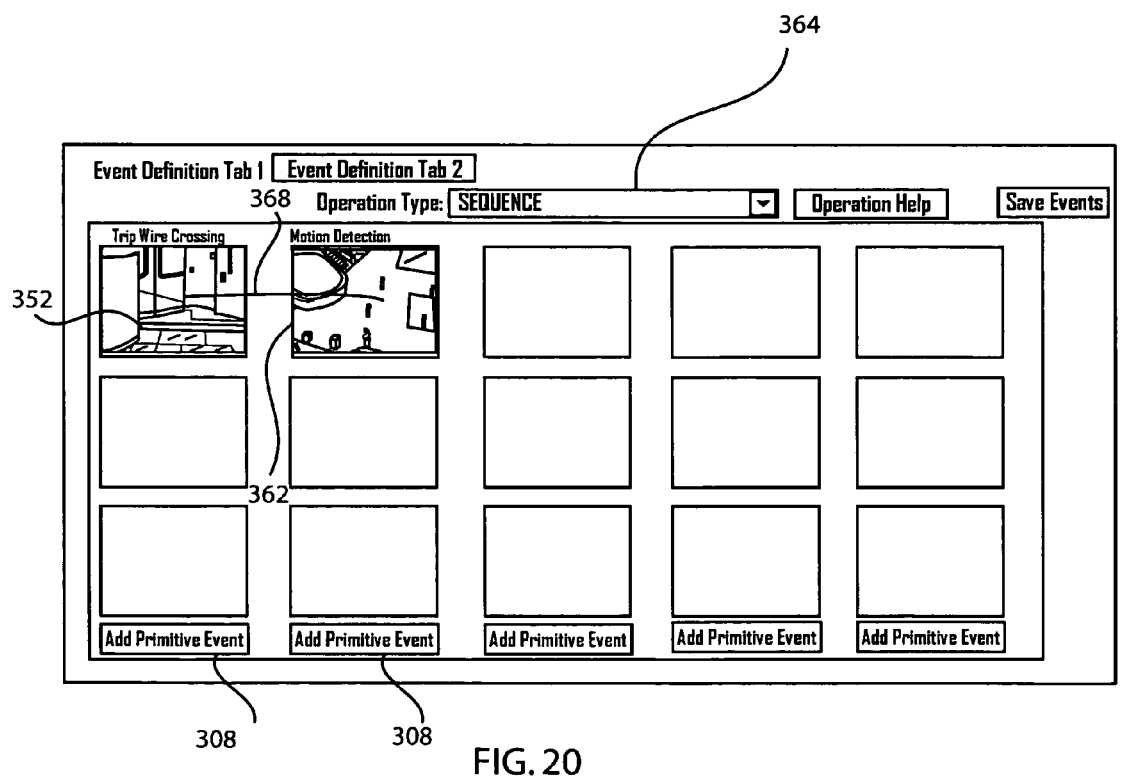
FIGS. 20-24 show the graphical user interface for establishing a link or relationship between primitives in accordance with one illustrative embodiment.

Referring to FIG. 20, when the user left clicks on one of the small images of a camera view, which shows the defined primitive event on that view, an arrow 368 is drawn. Then when the user clicks on another image showing another primitive event, the drawing of the arrow, starting from the first event and pointing to the second, is completed.

Figure 21:
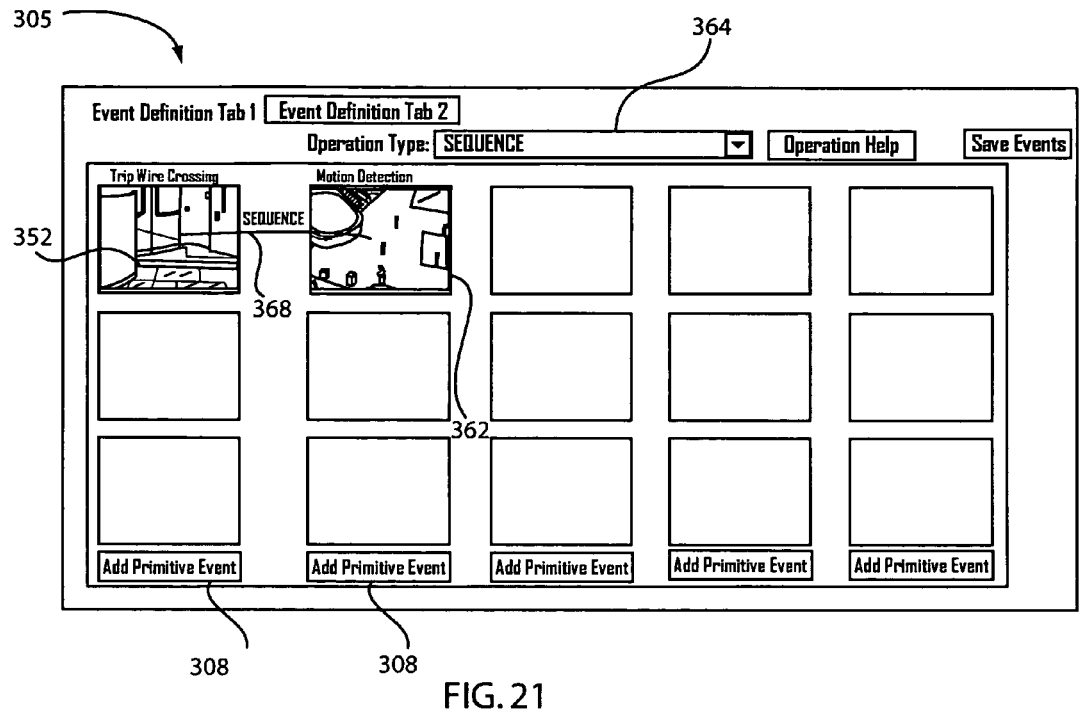

As shown in FIG. 21, the arrow 368 is displayed with the operation name (SEQUENCE) on the arrow 368. In this way, the two primitive events shown in panels 352 and 362 are "connected" or "related" to each other via the selected operation. In this example scenario, the operator used is the sequence operator. Thus, the defined composite event will be the primitive event, where the arrow 368 starts, followed by the primitive event which the arrow points to. FIGS. 20 and 21 illustrate the connection of the primitive events.

When the selected operator is "SEQUENCE", the minimum and maximum number of frames between the events in the sequence can be customized. Let m and M denote these two numbers respectively. The user defines a window of time that the second event should occur in after the first one. To customize the parameters of the "SEQUENCE" operator, the arrow 368 connecting the component events is selected by left clicking on it.

Figure 22:
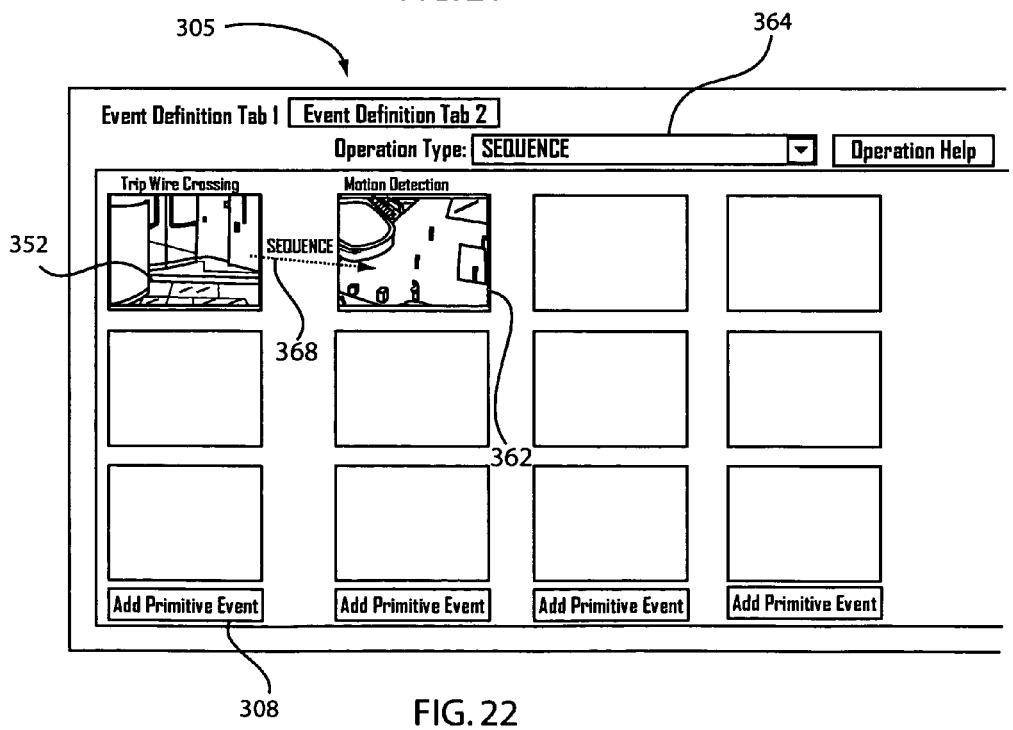
Figure 23:
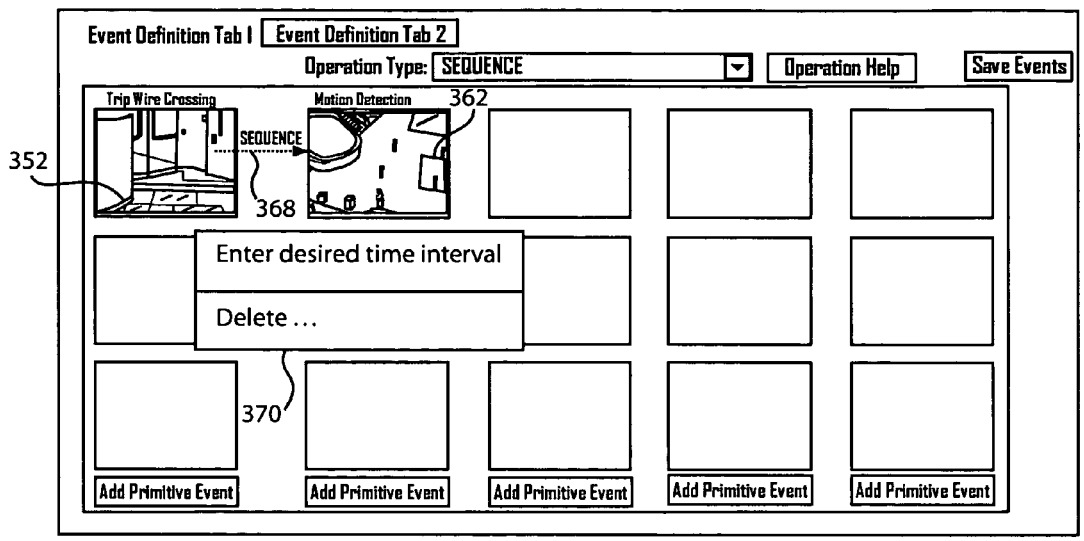
Figure 24:
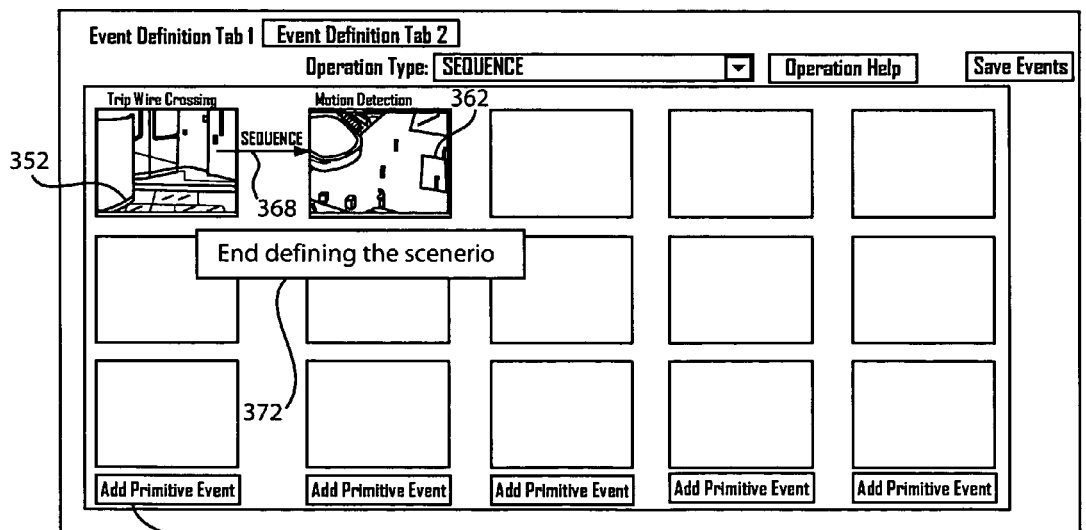

As shown in FIG. 22, the arrow 368 changes color or texture when it is selected. If the user right clicks on the mouse when the arrow 368 is selected, a popup menu 370 shown in FIG. 23 is displayed. This arrow 368 can be deleted or the parameters of the operation can be customized by using this menu. If the "Enter desired time interval" is selected, the dialog window shown in FIG. 8 is presented to the user, where the desired time interval between the events can be customized. If the user deselects the arrow 368 by left clicking anywhere other than the arrow 368, and then right clicks again, a pop-up 372 shown in FIG. 24 is displayed. When "End defining the scenario" is selected in pop-up 372, the definition of this composite event is completed.

The above example composite event scenario and the explanation of how it is defined in the system illustrates many advantages of the present system and the event definition scheme. Some of these advantages include:

1) When defining a composite event with a chosen operator, the user can use more than two component events (operands). For instance, the system permits defining a scenario where event D happens "after" event C, which happens "after" event B, which happens "after" event A. In this case, there is only one operator which is the "SEQUENCE" operator, and there are four operands. Similarly, one can define a composite event scenario, where event A "AND" event B "AND" event C "AND" event D all happen.

2) At the first level of the event definition, which happens on the "Event Definition Tab 1" of FIG. 16, any number of primitives can be defined. Then, by choosing an operator, these primitives can be combined with or related to each other to define multiple composite events.

3) Another useful property in a high-level language is combining more than two events by using different operators. For example, the user may want to define a composite event scenario E1, where E1≡(event A happens "after" event B) "OR" event C happens. In this case, parentheses may be employed because E2≡event A happens "after" (event B or event C happens) is a different event although the wording is the same. However, this functionality introduces a challenge in terms of defining the events visually and introducing them to the system. The present system provides this kind of functionality by its hierarchical structure. After a composite event is defined by using one operator, it can be named and saved. Then at the next level, which is a next tab (Tab 2) on the ActiveX control interface (305), it can be combined by other events by using a different operator. This structure permits composite event definitions such as E3≡(event A happens "after" event B) "OR" (event C happens "after" event D). E3 can be expressed as E3≡MyEvent1 "OR" MyEvent2, where MyEvent1 and MyEvent2 can be defined on the tab named "Event Definition Tab 1" and given these names. Then, they can be used as operands on the tab named "Event Definition Tab 2" to define E3.

In the above example, a composite event definition was shown. Individual primitive events can also be defined, and not combined by other events. For example, in addition to the above composite event, an "Abandoned Object" primitive event may be defined to show in which formats the primitive and composite events are saved into a file.

Information received from the user may be saved in an organized format. E.g., when the event definitions are finished, all the scenarios are saved into a well-structured XML file. The format of the XML file may be illustratively explained using a file created for the example scenarios described above. The outermost node of the created XML file is illustratively shown below:

+<EVENT_SCENARIOS>

When this node is opened, the following is seen:

−<EVENT_SCENARIOS>
   +<Event_Scenario>
   +<Event_Scenario>
</EVENT_SCENARIOS>

As can be seen above there are two <Event_Scenario> nodes, one for the composite event, and one for the primitive event definition. When the first <Event_Scenario> node is expanded:

```
− <EVENT_SCENARIOS>
    − <Event_Scenario>
        <OperationType Type="text">SEQUENCE</OperationType>
        + <Argument>
        + <Frame_Interval>
        + <Argument>
    </Event_Scenario>
    + <Event_Scenario>
</EVENT_SCENARIOS>
```

The first entry in the <Event_Scenario> node is the OperationType. In this case the OperationType is SEQUENCE. The next entry in the <Event_Scenario> node is a node called <Argument> which represents the first argument of the SEQUENCE operation. This node is followed by another node called <Frame_Interval>. The last entry is another <Argument> node representing the second operand of the SEQUENCE operation.

```
− <EVENT_SCENARIOS>
    − <Event_Scenario>
        <OperationType Type="text">SEQUENCE</OperationType>
        − <Argument>
            <ArgumentType Type="text">PRIMITIVE</ArgumentType>
            + <Individual_Alarm_Definition>
        </Argument>
        − <Frame_Interval>
            <MinInterval Type="int">1000</MinInterval>
```

-continued

```
            <MaxInterval Type="int">1500</MaxInterval>
        </Frame_Interval>
        − <Argument>
            <ArgumentType Type="text">PRIMITIVE</ArgumentType>
            + <Individual_Alarm_Definition>
        </Argument>
    </Event_Scenario>
    + <Event_Scenario>
</EVENT_SCENARIOS>
```

As seen above, when the <Argument> node is expanded, the first entry is the ArgumentType stating whether this argument is a composite event or primitive event. In this case the argument is a PRIMITIVE event. If the argument was a COMPOSITE event instead, then the next entry would be the OperationType again, stating the type of the operation relating the arguments of that composite argument. If the ArgumentType is PRIMITIVE, then the next node is the <Individual_Alarm_Definition>, which includes all the information about the primitive event definition.

The <Frame_Interval> node of the <Event_Scenario> has the minimum and maximum number of frames desired between the arguments of the SEQUENCE operation.

When the <Individual_Alarm_Definition> node is expanded, the entries shown below are seen. ViewID is the id number of the camera view. It tells which camera view the event was defined on. ClassID is the name of the primitive event, which is one of the six primitives we have. Identity is the description given to the event. <ViewDim> node has the information about the image of the camera view, specifically its width, height, and the origin location. If the definition of a primitive event includes defining a region of interest, this information is saved under the <ROIs> node. This node has a <Polygon> node for each region of interest. Each <Polygon> node is composed of <Vertex> nodes which have the <X> and <Y> coordinates of the vertices. If a schedule is defined for a primitive event, this information is saved under the <Active> node. It has the month, day, date, hour and minute information for the start and end times of the scheduling. The other parameters of the primitive event are saved under the <Parameters>.

For example, it can have the vertices of the trip wires or the minimum and maximum detected object sizes. Finally, the <Response> node has the <Email> and <Command> entries. <Email> holds the information about where to send an e-mail, and <Command> is the command to execute when this event happens.

```
− <EVENT_SCENARIOS>
    − <Event_Scenario>
        <OperationType Type="text">SEQUENCE</OperationType>
        − <Argument>
            <ArgumentType Type="text">PRIMITIVE</ArgumentType>
            − <Individual_Alarm_Definition>
                <ViewID Type="int">2</ViewID>
                <ClassID Type="text">Trip Wire Crossing</ClassID>
                <Identity Type="text">Lobby Door Exit</Identity>
                − <ViewDim>
                    <Width Type="int">320</Width>
                    <Height Type="int">240</Height>
                    <Origin Type="text">TopLeft</Origin>
                </ViewDim>
                <ROIs />
                − <Active>
                    − <Period>
                        − <Start>
                            <Month Type="int">1</Month>
```

-continued

```
            <Day Type="int">1</Day>
            <Date Type="int">1</Date>
            <Hour Type="int">0</Hour>
            <Minute Type="int">0</Minute>
        </Start>
      - <End>
            <Month Type="int">12</Month>
            <Day Type="int">31</Day>
            <Date Type="int">7</Date>
            <Hour Type="int">23</Hour>
            <Minute Type="int">59</Minute>
        </End>
      </Period>
    </Active>
    <Parameters Type="text"><TripWires><TripWire><Vertex><X
      Type="float">85.000000</X><Y
      Type="float">176.000000</Y></Vertex><Vertex><X
      Type="float">223.000000</X><Y
      Type="float">144.000000</Y></Vertex><Direction Type="int">-
      1</Direction><Object_Size><Minimum_Size
      Type="int">1404</Minimum_Size><Maximum_Size
      Type="int">76800</Maximum_Size></Object_Size></TripWire></TripWires>
      </Parameters>
    - <Response>
        <Email Type="text" />
        <Command Type="text" />
      </Response>
    </Individual_Alarm_Definition>
  </Argument>
- <Frame_Interval>
    <MinInterval Type="int">1000</MinInterval>
    <MaxInterval Type="int">1500</MaxInterval>
  </Frame_Interval>
- <Argument>
    <ArgumentType Type="text">PRIMITIVE</ArgumentType>
  - <Individual_Alarm_Definition>
      <ViewID Type="int">1</ViewID>
      <ClassID Type="text">Motion Detection</ClassID>
      <Identity Type="text">Outside Door Motion Detection</Identity>
    - <ViewDim>
        <Width Type="int">320</Width>
        <Height Type="int">240</Height>
        <Origin Type="text">TopLeft</Origin>
      </ViewDim>
    - <ROIs>
      - <Polygon>
        - <Vertex>
            <X Type="float">264.000000</X>
            <Y Type="float">101.000000</Y>
          </Vertex>
        - <Vertex>
            <X Type="float">319.000000</X>
            <Y Type="float">109.000000</Y>
          </Vertex>
        - <Vertex>
            <X Type="float">318.000000</X>
            <Y Type="float">188.000000</Y>
          </Vertex>
        - <Vertex>
            <X Type="float">253.000000</X>
            <Y Type="float">177.000000</Y>
          </Vertex>
        </Polygon>
      </ROIs>
      <Active />
      <Parameters Type="text">NumObj= 1 MinObj= 1 MaxObj= 76800
        MinFrmDur= 15</Parameters>
    - <Response>
        <Email Type="text" />
        <Command Type="text" />
      </Response>
    </Individual_Alarm_Definition>
  </Argument>
</Event_Scenario>
+ <Event_Scenario>
</EVENT_SCENARIOS>
```

The whole XML file (when all the nodes are expanded) is below. As can be seen under the second <Event_Scenario> node, when the scenario is a primitive event, the <OperationType> is NONE, and there is only one <Argument>.

```xml
- <EVENT_SCENARIOS>
  - <Event_Scenario>
      <OperationType Type="text">SEQUENCE</OperationType>
    - <Argument>
        <ArgumentType Type="text">PRIMITIVE</ArgumentType>
      - <Individual_Alarm_Definition>
          <ViewID Type="int">2</ViewID>
          <ClassID Type="text">Trip Wire Crossing</ClassID>
          <Identity Type="text">Lobby Door Exit</Identity>
        - <ViewDim>
            <Width Type="int">320</Width>
            <Height Type="int">240</Height>
            <Origin Type="text">TopLeft</Origin>
          </ViewDim>
          <ROIs />
        - <Active>
          - <Peroid>
            - <Start>
                <Month Type="int">1</Month>
                <Day Type="int">1</Day>
                <Date Type="int">1</Date>
                <Hour Type="int">0</Hour>
                <Minute Type="int">0</Minute>
              </Start>
            - <End>
                <Month Type="int">12</Month>
                <Day Type="int">31</Day>
                <Date Type="int">7</Date>
                <Hour Type="int">23</Hour>
                <Minute Type="int">59</Minute>
              </End>
            </Period>
          </Active>
          <Parameters Type="text"><TripWires><TripWire><Vertex><X
            Type="float">85.000000</X><Y
            Type="float">176.000000</Y></Vertex><Vertex><X
            Type="float">223.000000</X><Y
            Type="float">144.000000</Y></Vertex><Direction Type="int">-
            1</Direction><Object_Size><Minimum_Size
            Type="int">1404</Minimum_Size><Maximum_Size
            Type="int">76800</Maximum_Size></Object_Size></TripWire></TripWires>
            </Parameters>
        - <Response>
            <Email Type="text" />
            <Command Type="text" />
          </Response>
        </Individual_Alarm_Definition>
      </Argument>
    - <Frame_Interval>
        <MinInterval Type="int">1000</MinInterval>
        <MaxInterval Type="int">1500</MaxInterval>
      </Frame_Interval>
    - <Argument>
        <ArgumentType Type="text">PRIMITIVE</ArgumentType>
      - <Individual_Alarm_Definition>
          <ViewID Type="int">1</ViewID>
          <ClassID Type="text">Motion Detection</ClassID>
          <Identity Type="text">Outside Door Motion Detection</Identity>
        - <ViewDim>
            <Width Type="int">320</Width>
            <Height Type="int">240</Height>
            <Origin Type="text">TopLeft</Origin>
          </ViewDim>
        - <ROIs>
          - <Polygon>
            - <Vertex>
                <X Type="float">264.000000</X>
                <Y Type="float">101.000000</Y>
              </Vertex>
            - <Vertex>
                <X Type="float">319.000000</X>
                <Y Type="float">109.000000</Y>
              </Vertex>
            - <Vertex>
                <X Type="float">318.000000</X>
```

-continued

```
            <Y Type="float">188.000000</Y>
          </Vertex>
        - <Vertex>
            <X Type="float">253.000000 </X>
            <Y Type="float">177.000000 </Y>
          </Vertex>
        </Polygon>
      </ROIs>
      <Active />
      <Parameters Type="text">NumObj= 1 MinObj= 1 MaxObj= 76800
         MinFrmDur= 15</Parameters>
    - <Response>
        <Email Type="text" />
        <Command Type="text" />
      </Response>
      </Individual_Alarm_Definition>
    </Argument>
  </Event_Scenario>
- <Event_Scenario>
    <OperationType Type="text">NONE</OperationType>
  - <Argument>
      <ArgumentType Type="text">PRIMITIVE</ArgumentType>
    - <Individual_Alarm_Definition>
        <ViewID Type="int">2</ViewID>
        <ClassID Type="text">Abandoned Object</ClassID>
        <Identity Type="text">Abandoned Object close to door</Identity>
      - <ViewDim>
          <Width Type="int">320</Width>
          <Height Type="int">240</Height>
          <Origin Type="text">TopLeft</Origin>
        </ViewDim>
      - <ROIs>
        - <Polygon>
          - <Vertex>
              <X Type="float">196.000000</X>
              <Y Type="float">175.000000</Y>
            </Vertex>
          - <Vertex>
              <X Type="float">248.000000</X>
              <Y Type="float">145.000000</Y>
            </Vertex>
          - <Vertex>
              <X Type="float">315.000000</X>
              <Y Type="float">164.000000</Y>
            </Vertex>
          - <Vertex>
              <X Type="float">265.000000</X>
              <Y Type="float">208.000000</Y>
            </Vertex>
          </Polygon>
        </ROIs>
        <Active />
        <Parameters Type="text">MinObjSize= 15 MaxObjSize= 76800
           MinAbdTime= 5</Parameters>
      - <Response>
          <Email Type="text" />
          <Command Type="text" />
        </Response>
      </Individual_Alarm_Definition>
    </Argument>
  </Event_Scenario>
</EVENT_SCENARIOS>
```

Figure 25:
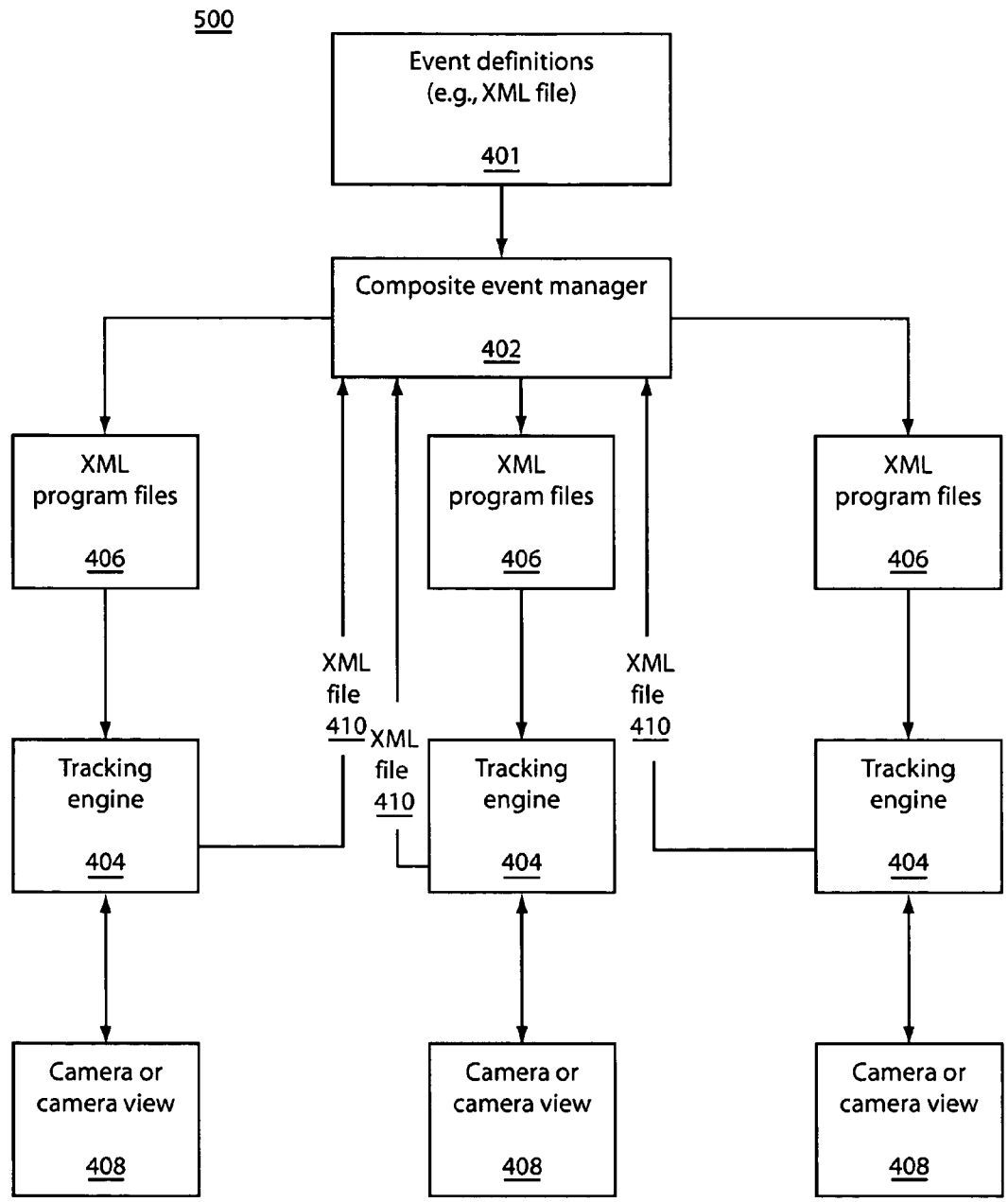
FIG. 25 is a block diagram showing components of the spatio-temporal event definition and detection system in accordance with an illustrative embodiment.

Referring to FIG. 25, an overall system 400 for creating detection scenario and monitoring these scenarios is illustratively shown. The detection of the events of interest includes extracting and grouping all the primitive events defined on a same camera view and communicating the events to a tracking engine 404 running on that view. This job is performed by a composite event manager 402. This manager 402 first parses an XML file 401, the format of which is explained above, with the event definitions programmed. Then, the manager 402 extracts all the primitive events, groups together the ones defined on the same camera view, and creates a separate XML file 406, for each camera view, composed of the definitions of these primitives. Then, these XML files 406 are sent to the tracking engines 404 running on the corresponding camera views 408.

When a primitive event is detected on a camera view recorded or monitored by cameras 408, an XML file 410 is generated for the detected event and is communicated to the composite event manager 402. This file 410 includes information about the camera view id, the name of the detected primitive event, and the start and end frames for this event. The composite event manager 402 checks for incoming data, and if there is an XML file received, parses it to check if the conditions of any of the existing event scenarios have been satisfied. If an event scenario is a primitive event, and if the information in the sent XML file matches the definition of this event, then this defined scenario is satisfied. However, for a composite scenario, the system 400 needs to check if all the arguments of the scenario have been detected, and if the operation between them is satisfied.

In one version of the system, it may not check if the object detected on different camera views is the same object. For instance, for a SEQUENCE operator, if a motion is detected in the first camera view, and then motion is detected in the second camera view within the required time interval, then an alert is generated. However, this does not affect the generality of the system and the way it works as a check to determine if the object is the same can be made. When defining a composite event, it can be stated if the detected objects should be the same or not. Then, the individual tracking engines 404 can return some appearance, direction and speed-based information to compare and decide if these objects are the same.

The multi-camera, spatio-temporal event detection system 400, permits a user to define multiple composite events of high-complexity, and then detects their occurrence in video sequences automatically. Thus, the system 400 not only tracks the objects, but also detects high-level, spatio-temporal events in the sequences. One of the advantages of the system 400 is that the events of interest, in any complexity, can be defined and communicated to the system in a generic way, which does not require any technical knowledge from the end-user. In other words, the events of interests are not pre-defined or hard-coded into the system, and thus are not in some limited number.

In the system 400, complicated and more sophisticated event scenarios can be built by using primitive events, and combining the primitive events by operators. The newly defined composite events can be named, saved and used as building blocks to combine them with other composite events. This layered structure makes the definition of events with higher and higher complexity possible. The defined events are preferably written to an XML file, which is then parsed and communicated to the tracking engines 404 running on the videos of the corresponding cameras. The events can span two or more different camera views, and use composite event definitions.

Figure 26:
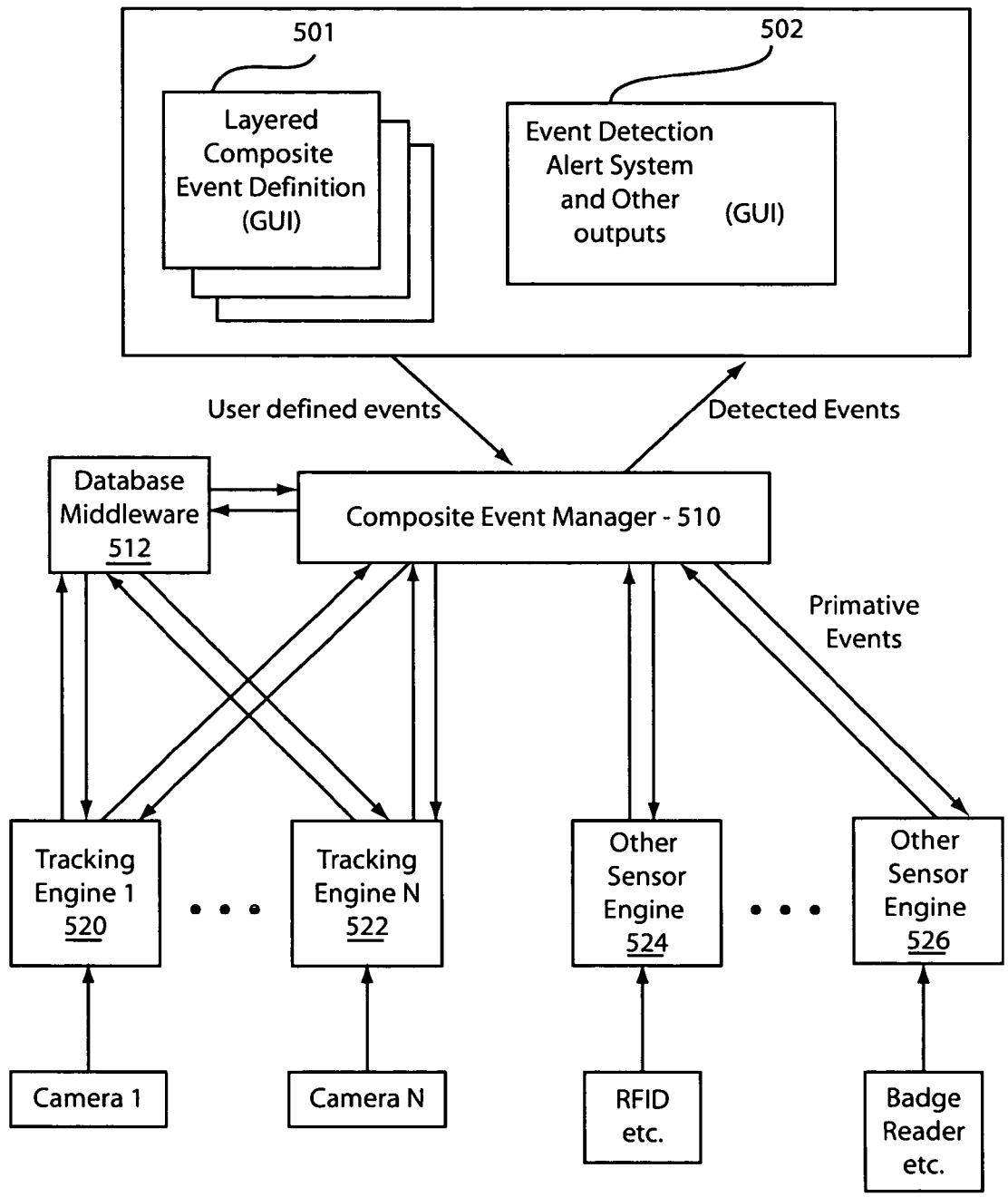
FIG. 26 is a block diagram showing components of the spatio-temporal event definition and detection system in accordance with another illustrative embodiment.

Referring to FIG. 26, a block diagram schematically shows components of the spatio-temporal event definition and detection system 500 in accordance with another illustrative embodiment. A user defines complex events in the layered composite event definition user interface 501. This component 501 is layered. Event definitions are communicated to a composite event manager 510. The composite event manager 510 parses these definitions to extract and group all primitive event definitions which belong to each sensor engines 520-526. Each sensor engine 520-526 uses the primitive event definitions to detect the occurrence of the specific event for the specified parameterization. The occurrence may also be detected from a database 512.

The engines 520-526 communicate the detection of primitive events back to the composite event manager 510. The composite event manager 510 checks for incoming data, parses the incoming data to check if the conditions of any of the composite event definitions are satisfied. If all the arguments of a complex event scenario are satisfied then the composite event manager 510 communicates this information to an event detection alarm system 502.

The layered composite event definition user interface 501 is a hierarchical interface to enable the user to build high level, semantically complex, composite events from a set of building blocks which are referred to as primitive events. Examples of primitive events are motion detection, directional motion detection, abandoned object detection, object removal detection and trip wire crossing. The composite event definition user interface 501 is preferably a graphical user interface on which the user can open videos from multiple camera views.

The main step in the detection of the defined events is extracting and grouping all the primitive events defined on the same camera view and communicating them to the tracking engine 520-526 running on that view. This job is performed by the composite event manager 520. This manager first parses the event definition file, then extracts all the primitive events, groups the ones defined on the same camera view together, and creates a separate event definition file for each camera view composed of the definitions of these primitives. In one embodiment, the event definition files are written using XML. These XML files are then sent to the tracking engines running on the corresponding camera views. When a primitive event is detected on a camera view, an XML file is generated for the detected event and is communicated to the composite event manager 510. This file includes information about the camera view ID, the name of the detected primitive event, and the start and end frames for this event. The composite event manager 520 checks for incoming data, and if there is an XML file received, parses it to check if the conditions of any of the existing event scenarios have been satisfied. If an event scenario is a primitive event, and if the information in the sent XML file matches the definition of this event, then this defined scenario is satisfied. However, for a composite scenario, the system needs to check if all the arguments of the scenario have been detected, and if the operation between them is satisfied.

Having described preferred embodiments of a system and method for spatio-temporal event detection using composite definitions for camera systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for monitoring events, comprising:
defining alert events based on primitive event types in an environment monitored by one or more monitoring devices;
setting alert parameters for each alert event;
combining alert events to create a composite alert event based on a plurality of alert events by providing an operator for combining the primitives where the primitives function as operands of the operator;
determining if multiple events comprising the composite alert event have occurred by monitoring one or more tracking engines; and
parsing the composite alert event by an event manager to provide an event definition to the one or more tracking engines.

* * * * *